US011080962B2

(12) United States Patent
Bitterlin

(10) Patent No.: US 11,080,962 B2
(45) Date of Patent: Aug. 3, 2021

(54) RESET OF PRIZE AMOUNTS TO SEMI-RANDOM VALUES

(71) Applicant: AGS LLC, Las Vegas, NV (US)

(72) Inventor: Alexander Christoph Albert Bitterlin, Atlanta, GA (US)

(73) Assignee: AGS LLC, Las Vegas, NV (US)

( * ) Notice: Subject to any disclaimer, the term of this patent is extended or adjusted under 35 U.S.C. 154(b) by 0 days.

(21) Appl. No.: 16/421,224

(22) Filed: May 23, 2019

(65) Prior Publication Data

US 2020/0372748 A1 Nov. 26, 2020

(51) Int. Cl.
*A63F 13/00* (2014.01)
*G07F 17/32* (2006.01)

(52) U.S. Cl.
CPC ...... *G07F 17/3211* (2013.01); *G07F 17/3216* (2013.01); *G07F 17/3241* (2013.01)

(58) Field of Classification Search
CPC ... G07F 17/3213; G07F 17/34; G07F 17/3244
See application file for complete search history.

(56) References Cited

U.S. PATENT DOCUMENTS

| | | | |
|---|---|---|---|
| 6,146,273 A | 11/2000 | Olsen | |
| 8,784,176 B2 | 7/2014 | Ryan | |
| 8,939,832 B2 | 1/2015 | Ryan | |
| 8,944,907 B2 | 2/2015 | Carranza | |
| 8,992,300 B2 | 3/2015 | Williams | |
| 9,011,233 B2 | 4/2015 | Ryan | |
| 9,039,519 B2 | 5/2015 | Augustine | |
| 9,117,343 B2 | 8/2015 | Augustine | |
| 9,183,706 B2 | 11/2015 | Vancura | |
| 9,218,724 B2 | 12/2015 | Pawloski | |
| 9,230,409 B2 | 1/2016 | Pawloski | |
| 9,235,965 B2 | 1/2016 | Tuck | |
| 9,311,786 B2 | 4/2016 | Ryan | |
| 9,345,961 B2 | 5/2016 | Ryan | |
| 9,607,481 B2 | 3/2017 | Ryan | |
| 9,626,840 B2 | 4/2017 | Williamson et al. | |
| 9,805,541 B2 | 10/2017 | Pawloski et al. | |
| 10,255,751 B2 | 4/2019 | Boese et al. | |
| 2007/0184896 A1* | 8/2007 | Dickerson | G07F 17/3239 463/25 |

(Continued)

*Primary Examiner* — Omkar A Deodhar
*Assistant Examiner* — Eric M Thomas
(74) *Attorney, Agent, or Firm* — Weide & Miller, Ltd.

(57) ABSTRACT

When awarding of a locally-incremented prize or a jackpot prize takes place in a chance-based gaming system, first there may be joy for the player who won but then there is a sense of lost opportunity for remaining other players as they come to realize at that moment that they have lost the opportunity to win that same prize and instead they must start all over in re-building a comparable prize amount. The notion of having to start from ground zero and build all the way up again may discourage some and induce them to walk away from the gaming machines. Methods are disclosed where the post-award prize reset amounts displayed to the remaining other players are not easily recognizable or attention attracting patterns that may induce the remaining other players to immediately recognize that a reset event has occurred, become disheartened and walk away.

13 Claims, 11 Drawing Sheets

(56) References Cited

U.S. PATENT DOCUMENTS

| | | | | |
|---|---|---|---|---|
| 2009/0124370 | A1* | 5/2009 | Walkwitz | G07F 17/3244 463/27 |
| 2011/0117989 | A1 | 5/2011 | Kennedy et al. | |
| 2015/0141114 | A1 | 5/2015 | Davis et al. | |
| 2015/0287275 | A1 | 10/2015 | Augustine | |
| 2016/0104345 | A1 | 4/2016 | MacGregor et al. | |

* cited by examiner

RESET OF PRIZE AMOUNTS TO SEMI-RANDOM VALUES

TECHNICAL FIELD

The present disclosure of invention relates to operations of gaming machines within a gaming environment.

BACKGROUND

Slot-type electronic and/or mechanical gaming machines, often also referred as slot machines, are popular fixtures in casino or other gaming environments. Such slot machines are generally controlled by installed software programs that enable rapid gaming action. Aside from slot machines, various other kinds of gaming devices, including electronically-assisted gaming tables are also generally controlled by installed software programs that enable rapid gaming action, not only for the particular gaming device, but also across large communities of similar gaming devices. More specifically, interest in gaming action can be enhanced by providing for one or both of locally-incremented prize amounts and larger community-based chances at winning growing jackpot pools, the latter often being referred to as progressives.

According to originally envisioned rules, when a locally-incremented prize is won or a jackpot pool prize is won, the corresponding prize amount for the immediately subsequent gaming action is reset to zero. When players see such a reset to zero event, some may become discouraged and walk away from their respective gaming machines because they then perceive a loss of opportunity to immediately win a significantly sized prize due to their concurrent recognition of the reset event. The walk away of discouraged players can be problematic for continued enjoyment by remaining players due to reduced cross-socialization potential and decrease of an emotionally charged environment as such may affect the socio-biological states of the remaining players. As a result of walk aways, efficiency of casino operations may be reduced because more gaming machines will be sitting unused (idling) on the gaming floor rather than being occupied by players and potentially generating revenue and/or player excitement at least at the socio-biological level. The ratio of costs for maintaining the machines and surrounding casino environment versus generated revenues may undesirably decrease. To counter the undesirable walk away from continued engagement with gaming machines once a prize is awarded, casino may resort to resetting the immediately next available prize amounts to fixed amounts other than zero (e.g., 50 dollars, 100 dollars). However, savvy players who have experience with specific ones or kinds of the gaming machines may commit the repeatedly seen reset amounts to personal memory (especially if the rest amounts are round numbers in increments of ten; like 50 dollars, or 100 dollars); and when they see those numbers, they instantly recognize them, realize that a reset has just occurred, become discouraged and walk away. It can be advantageous to all involved if instant recognition of reset events by players and a corresponding immediate perception of an opportunity having been lost can be suppressed.

It is to be understood that some concepts, ideas and problem recognitions provided in this description of the Background may be novel rather than part of the prior art.

SUMMARY

Various embodiments in accordance with the present disclosure of invention generally relate to improved operating of a gaming system having gaming machines that provide locally-incremented prize amounts and/or participate in progressive jackpot pools. In accordance with one aspect of the present disclosure, when a prize reset occurs as a result of having just awarded a previously built-up corresponding prize (e.g., a locally-incremented one or a jackpot) in response to a winning game outcome, the correspondingly displayed prize amount (also herein, running prize meter) is not reset to zero or to a relatively fixed reset amount (e.g., one represented by an easily memorable or easily recognizable digit sequence such as $100 or $1000) but rather to a more randomly varied reset amount. In one embodiment, a random reset reserve fund is progressively built up over time to a machine-determined positive balance level. This random reset reserve fund is allowed to occasionally go negative but is operated over time to remain solvent. When a predetermined game outcome occurs that entitles its player to a respective locally-incremented and accumulated prize amount or to a respective progressive jackpot pool that has been built up based on predetermined contributions from placed wagers, the corresponding prize meter is not automatically reset to zero or to an easily recognizable or memorable reset amount. Instead, a random number generator having predetermined minimum and maximum result values and a predetermined probability distribution function for possible results between is used to determine the corresponding reset amount to be next displayed. In one embodiment, the probability distribution function has continuity disrupting notches in it that are set such that for most of the randomized reset amounts, players will not be able to easily recognize memorize the reset amounts. More specifically, in one embodiment, reset amounts composed of easily memorizable or recognizable digit sequences are assigned low levels of chance for reoccurrence while reset amounts composed of digit sequences that are not as easily memorizable or recognizable are assigned higher levels of chance for reoccurrence.

In accordance with one aspect of the present disclosure, a machine-implemented automated method is provided for suppressing immediate recognition by users of one or more gaming machines that a prize amount reset event has taken place for one or more of the gaming machines, where the method comprises: (a) detecting that a chance-based awarding of a displayed prize amount has taken place for one or more of the gaming machines and the corresponding meter needs to be reset; (b) deterministically determining an initial reset amount for the corresponding meter in response to the detecting of the chance-based awarding; (c) altering the initial reset amount to one whose to-be-displayed digits sequence is not at least one of an easily recognizable and attention attracting pattern whereby a person viewing a display that presents the digits sequence of the altered reset amount will not immediately recognize from the viewed display that a reset event has occurred; and (d) enabling a displaying on the display of the digits sequence representing the altered reset amount.

In accordance with a further aspect of the disclosure, the altering includes applying a random or semi-random offset to the initial reset amount.

In accordance with a further aspect of the disclosure, when the semi-random offset is applied, the semi-random offset is generated using a notched probability distribution function having selectively picked notch points of continuity-interrupting values of reduced probability for one or more prize amounts whose displayed digit sequences would be easily recognizable as a reset amount.

Further aspects of the present disclosure of invention may be found in the following detailed descriptions.

BRIEF DESCRIPTION OF DRAWINGS

The present disclosure may be better understood by reference to the following detailed description taken in conjunction with the accompanying drawings, which illustrate particular embodiments in accordance with the present disclosure of invention.

DETAILED DESCRIPTION

Figure 1:
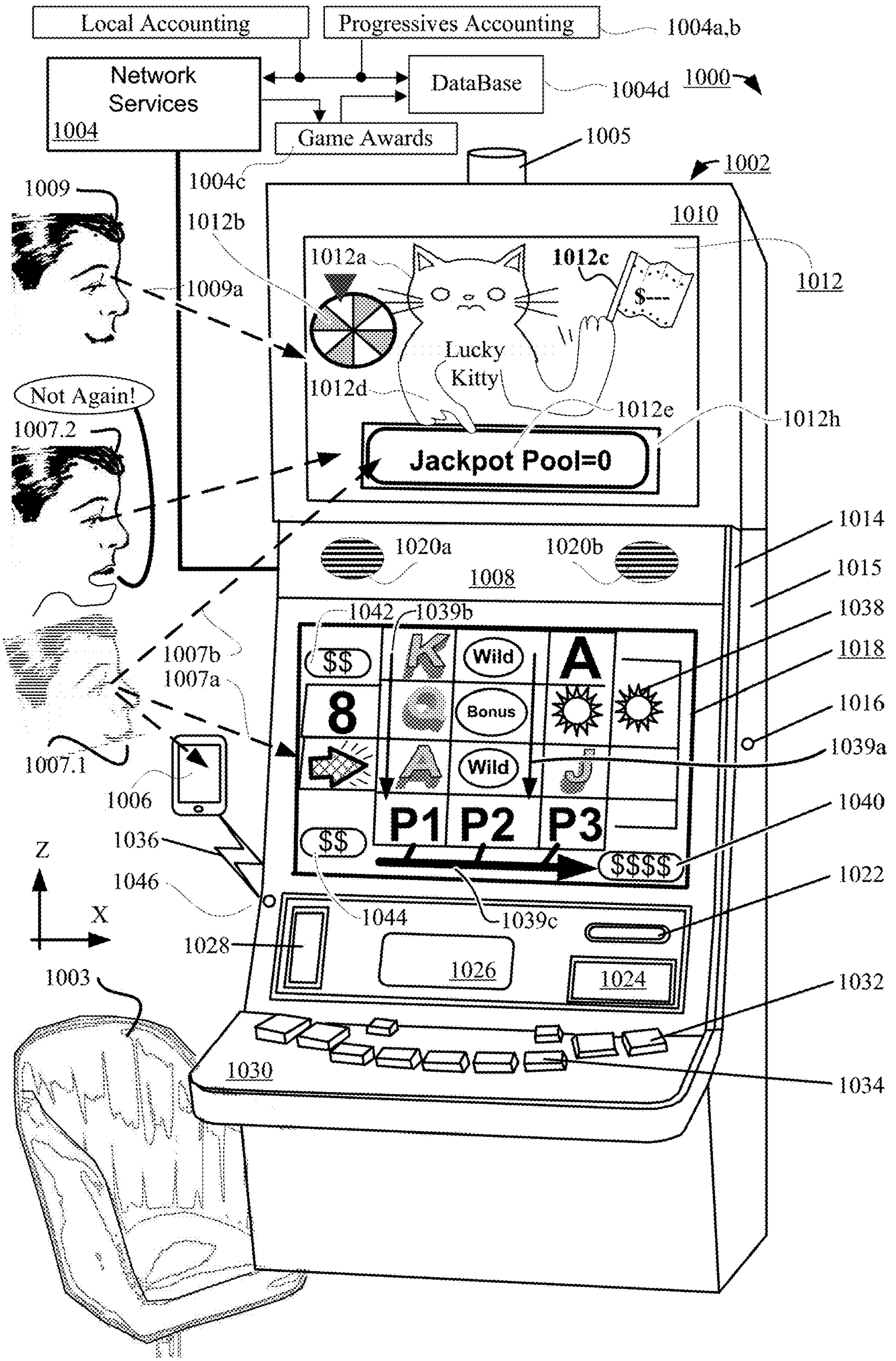
FIG. 1 illustrates a gaming system and environment including a wager-based gaming machine in accordance with the present disclosure.

Reference will now be made in detail to some specific embodiments in accordance with the present disclosure of invention. While the present disclosure is described in conjunction with these specific embodiments, it will be understood that it is not intended to limit the teachings of the present disclosure to the described embodiments. On the contrary, it is intended to cover alternatives, modifications, and equivalents as may be included within the spirit and scope of the teachings of the present disclosure.

In the following description, numerous specific details are set forth in order to provide a thorough understanding of the present disclosure. Particular embodiments may be implemented without some or all of these specific details. In other instances, well known process operations have not been described in detail in order not to unnecessarily obscure the present disclosure of invention. Although not explicitly shown in many of the diagrams, it is to be understood that the various automated mechanisms discussed herein typically include at least one data processing unit such as a central processing unit (CPU) where multicore and other parallel processing architectures may additionally or alternatively be used. It is to be further understood that the various automated mechanisms typically include or are operatively coupled to different kinds of non-transient storage mechanisms including high speed caches (which could be on-chip, package secured caches), high speed DRAM and/or SRAM, nonvolatile Flash or other such nonvolatile random access and/or sequential access storage devices, magnetic, optical and/or magneto-optical storage devices and so on. The various data processing mechanisms and data storage mechanisms may be operatively intercoupled by way of local buses and/or other communication fabrics where the latter may include wireless as well as wired communication fabrics.

In general, gaming systems which provide wager-based games are described. In particular, with respect to FIGS. 1 and 2, a gaming machine system and environment including a plurality of automated wager-based gaming machines in communication with network devices are described. The gaming machine system can support wager-based games where one or more of locally-incremented prize amounts and/or progressively growing prizes or awards (e.g., mega-jackpot, medium-jackpot, mini-jackpot) are made possible and/or where the unleashing of a whole series of bonuses (e.g., free spins) or other awards is made possible. The locally-incremented prize amounts are dedicated to respective single gaming machines and increase over time based on certain chance outcomes that are deemed by game rules to be insufficient for now awarding a pending total prize amount but sufficient for increasing one or more displayed, pending prize amounts of that individual gaming machine. When a more sufficient chance outcome occurs on the individual gaming machine, some or all of the pending prize amounts are awarded to the player and the game resets with respect to the awarded prize amounts. Progressive jackpots operate somewhat differently. Contributions are collected from wagers placed on gaming machines belonging to predetermined groups of such machines and these contributions grow corresponding pool amounts until a chance outcome occurs on one of the machines, where the probability of that chance outcome is less than that for chance outcomes that lead to local prizes being locally awarded. Then, the over-time built pool amount is awarded to the winner and respective pool resets. The awarding of a locally-incremented prize or a jackpot prize to a given player has both positive and negative consequences. First there is joy for the given player and his/her surrounding friends upon realization that someone has won a significantly sized prize. But then there is a sense of lost opportunity for remaining other players as they come to realize at that moment that they have lost the opportunity to win that same prize and instead they must start all over in re-building a comparable prize amount. The notion of having to start from ground zero and build all the way up again may discourage some and induce them to walk away. It can be advantageous to manage how the messaging of a reset event is delivered to the remaining other players so that they do not become immediately disheartened and walk away.

Some slot machines and/or other gaming devices may use mechanical reels or wheels and/or video reels or wheels to present to the respective players both action occurring during development of a game outcome and a finalized chance outcome of a gaming action. Typically the actual gaming action takes place rapidly and invisibly in a secured electronic part of the system, the outcome is determined there (e.g., based on use of a truly random and/or pseudo-random outcome determining mechanism) and then later, the development of the outcome and the final outcome are revealed to a corresponding one or more players by updating of various display and signage means such as video screens. The video screens (and/or other signage means) may also display pending prize amounts, including those of the locally-incremented prize amounts and/or the growing jackpot amounts. Typically, before each gaming action by the machine system (e.g., including display of spinning of the reels or wheels), the respective player at the gaming machine is required to ante up by placing at least one wager on the outcome of the machine's gaming action. In some games, a player can elect to have at least part of one or more of his/her wagers (e.g., side wagers) correspondingly contributed to one or more progressive jackpot pools.

As a general but not absolute rule, participation in the mega-sized jackpots is spread over relatively large populations and areas; for example across all casinos of a given jurisdiction (e.g., state wide, county wide, city wide, reservation wide or similar). Participation in the medium-sized jackpots is spread over comparatively smaller populations and areas; for example across a group of casinos located within a subsection of a city (e.g., along the Las Vegas, Nev. casino strip). Moreover, participation in the mini-sized jackpots is spread over comparatively yet smaller populations and areas; for example across a bank of similar slot and/or other gaming devices within one casino (e.g., a bank of about 20 or fewer slot machines located in a same sector of the casino floor and all featuring as an example, the Lucky Kitty slot game—a fictitious game name used here in conjunction with FIG. 1). By contrast, participation for winning the locally-incremented prize amounts is restricted to the respective individual gaming machines that display those locally-incremented prize amounts.

Excitement increases as the respective pending and displayed prize amounts of the locally-incremented ones and/or the mega-sized, medium-sized and medium-sized progressive jackpot pools grow and reach relatively large values for their respective local and pool communities. But then, as mentioned above, someone hits a prize-awarding gaming outcome and the corresponding machine-internal meter amount drops dramatically, possibly down to zero or close to zero. Interest in continuing to engage with the game then often drops dramatically at that instant in time and some players walk away from their respective gaming machines. (Additionally, if new players approach an idle machine after a reset event and recognize that it had just recently reset, they may turn around and walk away.) Such walk aways can reduce the socio-biological enjoyment/socialization experience for remaining players and increase the ratio of maintenance costs versus revenue for the casino. More specifically, the casino generally has to bear recurring fixed costs for cleaning the gaming machines and the flooring about them and providing an air conditioned environment. As the rate of walk-away due to reset recognition increases, the ratio of revenues versus recurring fixed costs disadvantageously decreases. The casino may then be forced to cut back on some of the services and amenities it provides to its patrons which make the gaming environment more enjoyable for the patrons (e.g., providing back ground music and/or other entrainment, providing on-the-spot food and drink services, and so on). Thus, if a system and method for reducing immediate recognition of reset events can be devised so as to thereby reduce the discouraged-player walk away rate, such a system and method would operate to increase benefits and utility to the remaining players as well as inuring to the benefit of the casino.

One prior art method for dealing with the loss of excitement when a jackpot is hit and the respective progressives pool amount is depleted is disclosed in U.S. Pat. No. 5,042,810 to Williams. Briefly, according to Williams '810, one or more "hidden" meters are incremented at the end of each game (e.g., on a roulette table) by a percentage of table turnover during a preceding game and the incrementing "hidden" meters are maintained so as to "replenish" jackpot funds when one or another of jackpots is paid out. This way, the new jackpot pending amount after a hit does not drop dramatically close to zero, but instead is quickly replenished from the hidden replenishment fund. The publicly displayed pool amount follows shortly thereafter to show the replenished amount so as to keep potential players engaged. The replenishment amounts can be repetitive though and players may come to recognize them when displayed.

Another prior art method for keeping players from walking away is disclosed in US early publication 2011-0117989 to Kennedy. Briefly, according to Kennedy '989, certain symbols which can lead to awarding of prizes are kept around on a semi-persistent basis so that players do not feel like they are starting all over again.

Chances for winning any one or more of the locally-incremented prize amounts or progressive jackpot pools can come in various software mediated ways. For example, a player at a slot machine may select or define a straight or other line (vertical or horizontal) or another pattern that will operate as an actively-wagered upon pay line/pattern over which, game-generated randomly distributed symbols are evaluated to determine if a winning combination is present (e.g., a sequence defining combination such King, Queen, Ace, etc. cards, hereafter also K, Q, A). If the actively-wagered upon pay line/pattern provides a winning combination, the prize amount is incremented and sometimes; with less frequent chance outcomes, the player is rewarded (e.g., monetarily and/or otherwise) for example with an awarding of the prize amount to the player. Various outcome enhancing symbols such as wild symbols can appear on the reels, wheels or other symbol presenting mechanisms of the game. Wild symbols typically serve as outcome enhancing substitutes for symbols needed to form a winning combination. In various prior art games, wild symbols: (1) can come into existence by other symbols individually morphing into wild symbols; (2) they can be individually copied from one reel or wheel to another; (3) they can be dropped from an animated character (e.g., cartoon) onto the reels or wheels to individually change certain existing symbols on a scatter distributed basis; and (4) they can populate a reel or wheel more frequently during so-called, free spins. On occasions, a player may be awarded with a wheel spin or other by-chance prize amount selecting mechanism that gives the player a crack at one or more of the progressive jackpot pools (e.g., the mega, medium and/or mini pool). In one example of a by-chance prize amount selecting mechanism, a player who won the primary gaming action (e.g., slot machine poker, table poker) is presented with a lottery-like scratch-to-reveal ticket (a virtual version of one) where the player's task is to scratch off a subset of the possibilities so as to match a set of symbols then presented elsewhere to the player. If he/she succeeds in matching the pattern, he/she is awarded the pending jackpot prize (e.g., $100 if it is a mini-jackpot). Due to such occasional sprinklings of chances at winning one of the progressive jackpot pools, the primary players and adjacent other persons may experience various emotional responses and derive entertainment value from not only the unique ways in which various games are played and game outcomes are developed but also from the chances of winning one of the progressive jackpot pools. The smaller pools such as those deemed to be mini jackpots generally pay off more frequently. The locally-incremented prize amounts are generally awarded even more frequently.

When the locally-incremented prize amounts are awarded at a given gaming machine and their respectively displayed meter amounts drop to zero or to another easily recognized value, players at, or approaching, that given gaming machine may instinctively recognize that a reset has just occurred and the placing of new wagers into that given gaming machine means that they are starting at the bottom and rebuilding the locally-incremented prize amount all over again rather than capitalizing on wagers previously made by other players at that same given gaming machine. In such cases, the reset recognizing players may walk away to look for a machine with better apparent prospects. The latter may be already occupied and then the walking away player may leave the casino floor altogether. It is desirable to avoid such an outcome.

FIG. 1 illustrates part of an automated gaming system 1000 in accordance with the disclosure that includes a wager-based gaming machine 1002 (e.g., an electronic slot machine). The wager-based gaming machine 1002 can include wireless or wired communication interfaces which allow communications with remote servers and/or other devices including a remote services providing network 1004 (e.g., having service providing servers and/or other data storing, communicating and data processing units—not explicitly shown). The services providing network 1004 can provide privacy/integrity-secured services such as but not limited to player tracking and management of progressive gaming. (Some specific network services are described in more detail in conjunction with FIG. 2). The player tracking service and the local/progressive gaming management services can be parts of a player and prizes accounting system that for example keeps track of each player's winnings and expenditures and of total contributions to one or more progressive jackpot pools and/or current values of locally-incremented prize amounts as indicated at 1004*a,b*. In addition, the gaming machine 1002 can include wireless communication interfaces, such as a wireless interface 1046 (internal, not specifically shown) which allow communication with one or more mobile devices, such as a mobile phone 1006 (only one shown), a tablet computer, a laptop computer and so on via respective wireless connections such as 1036. The wireless interface 1046 can employ various electronic, optical or other electromagnetic wireless and secured or non-secured communication protocols, including for example TCP/IP, UDP/IP, Bluetooth™ or Wi-Fi.

The respective mobile phones (e.g., 1006) and/or tablet computers and/or other mobile devices can be owned and/or utilized by various players, potential customers, authorized casino operators/agents or authorized gaming inspectors. A mobile device carried by a primary player (one directly playing at the given machine, e.g., player 1007.1) can be configured to perform secured gaming related functions, such as functions associated with transferring funds to or from the specific gaming machine 1002 and the primary player's account(s) or functions related to player tracking. In one embodiment, the mobile device carried by the primary player (e.g., 1007.1) can be configured to call for operator assistance and to provide the location of the mobile device so that a casino operator/agent can find the player requesting assistance. A mobile device carried by a casino operator/agent can be configured to securely perform operator related functions, such as responding to calls for operator assistance, performing hand pays, responding to tilt conditions or collecting metering related information. A mobile device carried by an authorized gaming inspector can be configured to perform inspection related functions, such as actuating software verification procedures.

Use of mobile devices is not limited to secured transactions. In one embodiment, mobile devices may be used for social networking. For example, a primary player 1007.1 may authorize his/her mobile device (e.g., 1006) to automatically interact with a currently used gaming machine 1002 for the purpose of automatically posting to a user-chosen social network various announcements such as, but not limited to, that the primary player 1007.1 has been having fun playing the Lucky Kitty game (a fictitious name for purposes herein) for X hours at the given gaming establishment or that the Lucky Kitty game has just awarded the primary player 1007.1 a symbols upgrade that now gives that player an opportunity to spin for a mega- and/or mini-jackpot and/or other awards. The primary player 1007.1 may alternatively or additionally authorize his/her mobile device (e.g., 1006) to automatically announce (wirelessly) to a selected group of friends or associates that player 1007.1 has just been awarded an opportunity to spin for a jackpot and/or other awards and inviting them to stop by and watch the fun (e.g., as nearby other person 1009 is doing over the shoulder of the primary player 1007.1, where the latter in one embodiment, is seated in chair 1003 situated in front of gaming machine 1002.)

According to the same or an alternate embodiment, the primary player 1007.1 may use his/her mobile device (e.g., 1006) to temporarily reserve the particular gaming machine 1002 for a predetermined amount of time (e.g., no more than say 10 to 30 minutes) so that the primary player may temporarily step away to attend to various needs. While the primary player 1007.1 is temporarily away, the gaming machine 1002 may display a reservation notice saying for example, "This machine is reserved for the next MM minutes by a winning player who was recently awarded a mini-jackpot and a lucky opportunity to spin for the mega-jackpot and/or other awards. Stand by and watch for more such lucky opportunities!" (where here MM is a progressively decreasing time counter). In an alternate scenario, while the primary player 1007.1 is temporarily away, the gaming machine 1002 may display a reservation notice saying for example, "This machine is reserved for the next MM minutes by a winning player who has recently built up pending prize amounts P1, P2 and P3. Stand by and watch to see if the player's luck continues!" The reservation notice may be prominently posted on an upper display 1012 of the gaming machine 1002 as shall next be described.

The gaming machine 1002 can include a base cabinet 1008 and an upper or top box 1010 fixedly mounted above the cabinet. The top box 1010 includes an upper display 1012. The upper display 1012 can be used to display video content, such as game art associated with the game being currently played on the gaming machine 1002. For example, the game art can include one or more animated wheels or reels (or other chance/opportunity indicating mechanisms) and/or one or more animated creatures (e.g., the flag holding Lucky Kitty illustrated at 1012*a*). The animated wheels or reels (e.g., virtual wheel 1012*b*) can be configured to spin and to stop to reveal an occasional opportunity to spin for a jackpot and/or other awards and/or the awarding of a prominently displayed amount 1012*e*. In one embodiment, the predetermined stoppage position or area or awarding of a substantially large prize may be pointed to by an animated finger 1012*d* of the Lucky Kitty character 1012*a* (or other appropriate animated figure). In one embodiment, a free other hand of the character may hold a signage such as the illustrated flag 1012*c* that shows the currently pending prize amount (publicly displayed amount).

In the illustrated scenario, however, someone else has just hot the jackpot and the Lucky Kitty character 1012*a* shows itself as sad that the jackpot pool amount 1012*e* has reset to zero. The Lucky Kitty character 1012*a* (or other appropriate animated figure) may temporarily wave an attention getting item such as flag 1012*c*, or wave a virtual fireworks sparkler, etc. at the appropriate times when the pending prize amount is relatively large. However, in the illustrated scenario where the jackpot pool amount 1012*e* has reset to zero (or another easily recognizable reset amount), the saddened Lucky Kitty character 1012*a* will not be vigorously waving the attention getting flag 1012*c*. More experienced primary players such as the illustrated 1007.2 may; upon quick recognition of the prize reset condition, utter words to the effect of "Not again!" (or think that way) and then walk away. This reaction may prompt nearby bystanders like 1009 to also walk away. In other words, the walk away phenomenon can cascade into positive feedback loop mechanism in which second in time players see the first-to-recognize players walking away discouraged and then the second in time players walk away, thereby inducing third in time players and so on to also walk away.

In accordance with an aspect of the present disclosure, recognition suppressing measures are automatically and repeatedly taken to reduce the likelihood that players like the illustrated 1007.2 will quickly recognize that a prize reset condition has just occurred. This reduces the likelihood that they will walk away or induce others to walk away. More specifically, in one embodiment, reset prize amounts are randomly picked out of predetermined reset amount ranges so that a same recognizable amount or easily-recognizable ones of rounded amounts do not repeatedly appear when a prize reset condition occurs.

Before explaining further aspects of the reset recognition suppressing measures, other aspects of the gaming environment are discussed. The actual carrying out of gaming actions typically takes place within the more secure internals of the services providing network block 1004 while the display or signage outputs of a given slot machine (e.g., 1002) are updated afterwards. Although shown as being external of block 1004 for sake mentioning, the secured internals of the services providing network block 1004 may include a progressives accounting block 1004*a* which manages the metering for all ongoing progressive games, respective local accounting blocks 1004*b* (only one shown) which manage the metering for respective locally-incremented prize amounts (e.g., P1, P2, P3) of respective individual gaming machines, a games awarding control block 1004*c* which manages the awarding of prizes to individual players for both non-progressive gaming actions and progressive gaming actions and a database 1004*d* which records transactions so that they can later be audited on an as needed basis. More details are provided below in conjunction with FIG. 2. Briefly, groups of gaming machines like 1002 are typically organized as banks (e.g., 3 slot machines per bank) and groups of banks are assigned to different progressive gaming actions. In one example, no more than 6 banks (18 slots) are assigned to any one specific mini-jackpot progressive.

Continuing with the overall general description of FIG. 1, in alternate embodiments, the top box 1010 can include one or more mechanical and/or electronic devices in addition to the upper video display 1012. For example, mechanical devices, such as one or more mechanical wheels can be mounted to or within the top box 1010. The mechanical wheel(s) can include markings that indicate various bonus award situations and/or situations where large (mega-) or smaller jackpots might be won. The wheel(s) can be spun and stopped at particular stopping points to reveal a bonus award situation or a multi-symbol transformation situation (e.g., awarding multiple wild cards, where the latter can increase the chance for winning a jackpot). In yet other embodiments, the top box 1010 can include a plurality of upper displays that provide similar functions. With respect to chance providing mechanisms as described herein, it is to be understood that such can include not only mechanical chance providing mechanisms (e.g., mechanical spinning wheel with relatively unpredictable stop position), but also electronically based chance providing mechanisms that can be implemented in the form of digital and/or analog electronic circuits. Such circuits may rely on flip-flops or registers designed with intentional meta-stability and/or on noise intolerant switching circuits that are intentionally exposed to random noise (e.g., thermal noise) so as to provide relatively random and unpredictable outcomes. In one embodiment, an automatically repeatedly actuated code/data verifier is called upon to verify that utilized software and control data use pre-approved hardware, firmware and/or software for properly providing random chances of respective predetermined probabilities at winning and or getting a chance to spin for respective prizes including for respective progressive jackpot pools (e.g., mega-, medium and/or mini-jackpots). Prior art technologies for truly random or pseudo-random picking of outcomes from respective finite outcome sets are too numerous to mention all here. Examples of Random Number Generation (RNG) include Oscillator controlled RNGs, Linear feedback shift register based RNGs; RNGs using Plural parallel outputs bits; Seed value controls for RNGs; Truly random number RNGs; RNGs with Plural parallel outputs, etc. More specific examples of RNGs are provided for example in U.S. Pat. No. 9,830,130 (Random number generator); U.S. Pat. No. 9,792,089 (Random number generator using an incrementing function); U.S. Pat. No. 9,778,913 (Method of generating uniform and independent random numbers); U.S. Pat. No. 9,640,247 (Methods and apparatuses for generating random numbers based on bit cell settling time); USPTO PreGrant 20170262259 (Method for Generating Random Numbers and Associated Random Number Generator); PCT/EP2017/069185 (Quantum Random Number Generator and Method for Producing a Random Number by Means of a Quantum Random Number Generator). A simple example of an RNG is a high speed asynchronous oscillator (e.g., GHz range) driving a wrap-around counter whose counting is stopped or captured by an asynchronous event of substantially slower and unsynchronized timing resolution (e.g. a user pushes a button, background noise is detected, etc.). The output of the stopped/copied counter may then drive an address input of lookup table populated by predetermined outcome values (e.g., playing card symbols) at their respective outcome frequencies. A particular outcome is thereby picked in a substantially random and optionally statistics skewed manner (skewed by the LUT) based on its frequency of appearance within the lookup table. (See also the example of FIG. 3C.)

It will be appreciated by those familiar with gaming environments that participants in various gaming environments (also briefly see FIG. 2) include respective primary players like 1007.1 who are directly using their respective slot machines (e.g., 1002) and are each typically seated on a chair (e.g., 1003) disposed in front of the gaming machine so as to thereby position that primary player's eyes substantially level with a central vertical position (along the vertical Z axis) with a primary game outcome display area 1018 of the gaming machine 1002 thus allowing for a comfortable gaze angle indicated by viewing vector 1007*a*. The primary game outcome display area 1018 typically being positioned vertically below and slightly spaced apart from the upper video display area 1012. The vertical elevation of the upper video display area 1012 is chosen so as to be easily viewed by adjacent player(s) (e.g., 1007.2) who is/are directly using adjacent slot machines (for example at an eye incline angle shown as viewing vector 1007*b*) and also to be easily viewed by adjacent bystanders 1009 (e.g., a player's friends) who are standing nearby the primary player or nearby one of the adjacent players or are nearby passers by who happen to be passing by in an area where they can view part of the gaming action(s) of one or more of the slot machines; and in particular the actions displayed by the upper video display 1012 at a comfortable viewing vector 1009*a*.

Due to real or simulated movements of the mechanical reels and/or video reels in the primary game outcome display area 1018 and in the upper video display area 1012, the primary players and the adjacent other persons may experience various emotional responses and derive entertainment value and expectations for further excitement from the unique ways in which the slot game (e.g., the Lucky Kitty game illustrated as an example in areas 1012 and 1018 or other such software driven gaming actions) are progressing. For example, when a low frequency winning hand or winning pattern appears on a wagered—for pay line or pattern presentation area such as that of vertical line 1039*a* (e.g., a chance hit of multiple Wild and/or Bonus symbols), in one embodiment, a corresponding pending prize amount P2 (where P2 is actually displayed as a digit sequence representing credits or money) is incremented accordingly and temporarily flagged (e.g., by flashing, highlighting or otherwise). Players are given to understand that this locally-incremented pending prize amount (e.g., P2) may be next awarded to the player (or added into accumulating credits counter 1040) with a next lucky spin of the reels and/or of other alike chance-based mechanisms (e.g., lucky spin wheel 1012*b*). This understanding can entice the primary players (e.g., 1007.1, 1007.2) to stick around and keep playing. It may also entice the adjacent bystanders 1009 (e.g., a player's friends) to stick around and keep watching. All this can add to the excitement level and enjoyment aspects in the immediate environment of the local gaming machine (e.g., 1002).

As another example, a chance simultaneous hit of two wagered upon pay lines or pay patterns, more specifically, in the illustrated example, the K-Q-A sequence down vertical line 1039*b* and the Wild-Bonus-Wild sequence down vertical line 1039*a* may cause relatively large increments to be added to locally-incremented pending prize amounts P1 and P2 with appropriate bells, lights or other attention grabbing other effects (e.g., flashing arrow noted by gaze line 1007*a*) being automatically presented on the gaming machine. In one embodiment, Players are given to understand that two or more of such locally-incremented pending prize amounts (e.g., P1 and P2) may be summed and next awarded to the player (or added into accumulating credits counter 1040) with a next lucky spin of the reels and/or of other alike chance-based mechanisms (e.g., lucky spin wheel 1012*b*). This understanding can entice the primary players (e.g., 1007.1, 1007.2) to stick around and keep playing. It may also entice the adjacent bystanders 1009 (e.g., a player's friends) to stick around and keep watching. All this too can add to the excitement level and enjoyment aspects in the immediate environment of the local gaming machine (e.g., 1002).

In accordance with one aspect of the present disclosure, before the primary player 1007.1 spins for a relatively large potential awarding of locally-incremented pending prize amounts (e.g., P1+P2+P3) or for a relatively large potential awarding of a progressive jackpot (e.g., using virtual wheel 1012*b*), attention grabbing further and larger displays appear on the upper video display 1012 (e.g., "Big Win Possible Here!"—not shown) so they are in the line of sight 1009*a* of bystanders or other primary players. This can further increase emotional levels of all involved and heighten enjoyment of the gaming actions. In other words, a mixture of emotions may be created of both heightened expectations and foreboding that all the expected rewards may or may not be realized. If the primary player 1007.1 continues to win low frequency winning hands such as the illustrated K-Q-A sequence shown along vertical line 1039*b* and/or continues to win low frequency winning symbol patterns shown along vertical line 1039*a*, the expectations for summed payouts 1039*c* (e.g., P1+P2+P3) or for a relatively large potential awarding of a progressive jackpots or like big payouts can increase, thus providing increased entertainment and excitement to those nearby the gaming machine 1002 (and optionally to those on social media who are following the primary player's progress).

At some point in time one of the potential big payouts is hit (e.g., either a large jackpot amount displayed in area 1012*e* or one or more of the locally-incremented pending prize amounts P1, P2, P3 displayed above prize summing line 10139*c*) and then there is an anti-climatic follow up period where some players (e.g., 1007.2) may realize that a prize reset event has occurred and the bigger potential prize amounts are no longer available. Such realization is often hinged on the more savvy players spotting a frequently used rest amount (e.g., $50, $100, 1000 credits) as expressed by a corresponding sequence of digits and then instantly recognizing that the prize reset event has just occurred and perhaps remarking words of disappointment such as the illustrated "Not again!" by player 1007.2 in FIG. 1.

In accordance with the present disclosure, one or more methods are disclosed herein for suppressing instantly recognition by players of at least the more frequent prize resetting events. However, before delving into details of such methods; yet further details for one embodiment are first provided. The base cabinet 1008 of one embodiment includes an internal access entry mechanism instantiated for example as door 1014. The door 1014 swings outward and is coupled to a back portion 1015. The door 1014 includes a locking mechanism 1016. During normal operation, the door 1014 is locked. Typically, unlocking the door 1016 causes the gaming machine 1002 to enter a tilt mode where gaming functions, such as the play of a wager-based game, are not available. This tilt mode can be referred to as a hard tilt.

The cabinet 1008 can include a number of apertures that allow access to portions of a number of devices which are mounted within the cabinet. These gaming devices can include, but are not limited to displays such as 1018 and 1026, speakers such as 1020*a* and 1020*b*, a printer 1022, a bill acceptor 1024, a magnetic and/or chipped card reader 1028 and a resting shelf and/or button panel 1030 including buttons 1032 and 1034. As described in more detail below, these gaming devices can be used to generate wager-based game play on the gaming machine 1002.

In particular embodiments, the bill acceptor 1024 can be used to accept currency or a printed ticket which can be used to deposit credits into an account maintained for the primary player 1007.1 and/or the gaming machine 1002. The credits can be used for wagers. The printer 1022 can be used to print tickets to transfer credits from one gaming machine (e.g., 1002) to another or to monetize accumulated credits. Typically, the tickets can be redeemed for cash or additional game play, such as game play on another gaming machine or at a gaming table.

Figure 2:
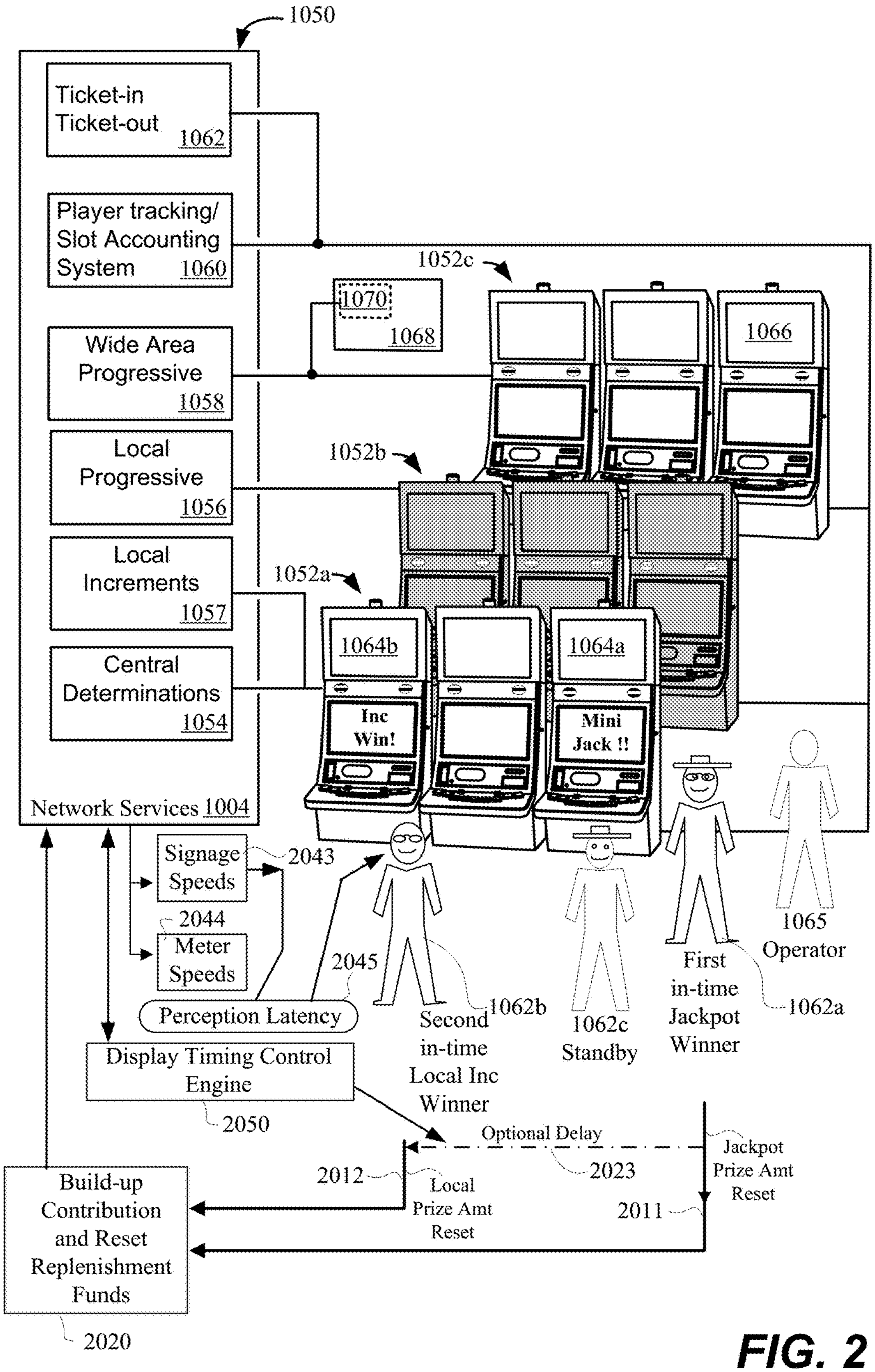
FIG. 2 illustrates a gaming system including three banks of gaming machines that may all participate in a same progressive jackpot pool.

The bill acceptor 1024 and printer 1022 printer can be part of ticket-in/ticket-out (TITO) system 1062 illustrated in FIG. 2. The TITO system 1062 can be included as one of the secured services provided by the services network 1004. The TITO system allows a ticket printed at a first gaming machine with a credit amount to be inserted into a bill acceptor at a second gaming machine and validated for game play. After validation, the credit amount associated with the ticket can be made available for game play on the second gaming machine. Additional details of the TITO system 1062 are described below in conjunction with FIG. 2.

The bill acceptor 1024 can include a slot surrounded by a bezel which allows banknotes of various denominations or printed tickets to be inserted into the bill acceptor. The bill acceptor 1024 can include sensors for reading information from the banknotes and determining whether the banknotes inserted through the slot are valid. Banknotes determined to be invalid, such as damaged or counterfeit notes, can be automatically ejected from the bill acceptor 1024. In some instances, the bill acceptor 1024 can include upgradeable firmware and a connection to additional network services. Via the network connection, new firmware, such as new counterfeit detection algorithms can be downloaded for installation into the bill acceptor 1024.

The bill acceptor 1024 includes mechanisms for guiding the banknotes or printed tickets past the internal sensors. Banknotes or printed tickets which are accepted can be guided to a bill stacker (not shown) located within the cabinet 1008 of the gaming machine 1002. The bill stacker can hold a maximum number of bank notes or printed tickets, such as up to two thousand.

The gaming machine 1002 can include a sensor for detecting a fill level of the bill stacker. When the bill stacker is full or close to being full, the gaming machine 1002 can be placed in a tilt mode. Next, the cabinet door 1014 can be opened by authorized casino personnel and the full bill stacker can be replaced with an empty one. Then, the door 1014 can be closed and the gaming machine 1002 can be restored to a normal operational mode in which it is available for game play.

One function of the printer 1022 is to print "cash out" tickets. In a "cash out," credits available on the gaming machine can be transferred to an instrument, such as a printed and/or magnetically encoded ticket, or wirelessly transferred by way of a secure link to an appropriate account (e.g., the primary player's account) for later access. Typically, a "cash out" can be initiated in response to pressing one of the physical buttons, such as 1032 or 1034, or touch screen button output on a display, such as primary display 1018 or a secondary display such as the one 1026 illustrated to be smaller than and disposed below the primary game outcome display 1018.

In one embodiment, the printer 1022 can be a thermal printer. The printer can be loaded with a stack of tickets, such as a stack with two hundred, three hundred or four hundred tickets. Mechanisms in the printer can grab tickets from the ticket stack and transport the tickets past the print heads for printing. The ticket stack can be located in an interior of the gaming machine cabinet 1008.

The printer 1022 can include sensors for detecting paper jams and a status of the ticket stack. When a paper jam or low ticket stack is detected, the gaming machine 1002 can enter a tilt mode where game play is suspended. In one embodiment, a tower light 1005 disposed above the upper box 1010 can light to indicate the tilt status of the gaming machine 1002. After the tilt condition is cleared, such as by clearing the paper jam or replenishing the ticket stack, the gaming machine 1002 can enter a normal operational mode where game play is again available.

Figure 5:
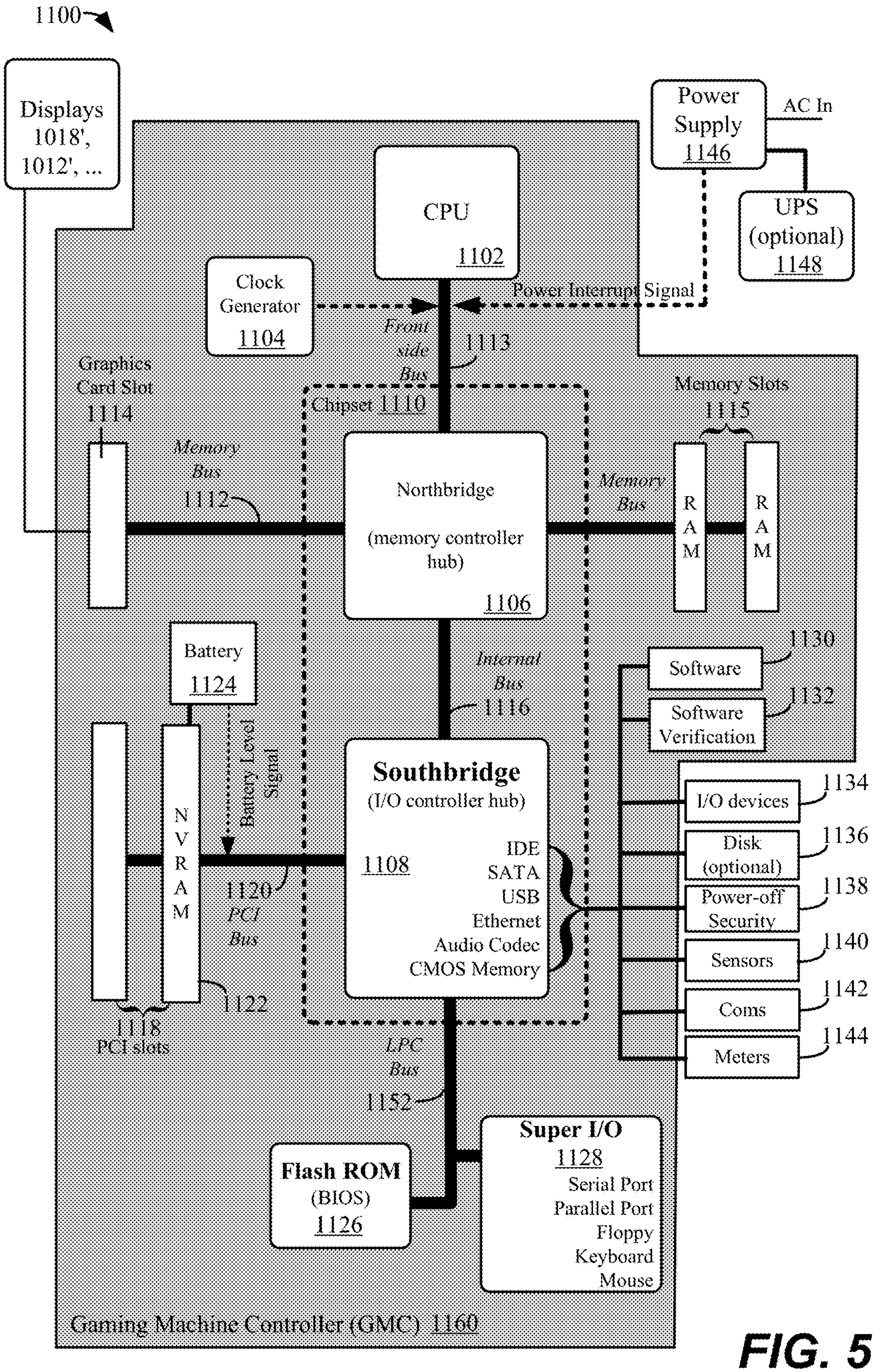
FIG. 5 illustrates a block diagram of gaming machine components including a gaming machine controller in accordance with the present disclosure.

In particular embodiments, the printer 1022 can be coupled to a gaming machine controller (see 1160 in FIG. 5). The gaming machine controller 1160 can be configured to send commands to the printer which cause a "cash out," ticket to be generated. In addition, the printer 1022 can be coupled to other systems, such as a player tracking system (e.g., 1060 in FIG. 2). When coupled to the player tracking system, commands can be sent to the printer 1022 to output printed tickets redeemable for comps (comps refer to complimentary awards, such as but not limited to free credits, a free drink, a free meal or a free room) or printed coupons redeemable for discounts on goods and services.

As mentioned, in some embodiments, one or more wireless interfaces 1046 can be provided to operate as secured and/or unsecured wireless communication connections 1036. The wireless connections can be established for example between the gaming machine 1002 and one or more mobile devices, such as smart phone 1006. The wireless connection 1036 can be used to provide functions, such as but not limited to player tracking services, casino services (e.g., ordering drinks, calling for operator assistance) and enhanced gaming features (e.g., displaying game play information on the mobile device). The wireless interface can be provided as a stand-alone unit or can be integrated into one of the devices, such as the bill/ticket acceptor 1022 and the card reader 1028. In addition, the bill/ticket acceptor 1022 and the card reader 1028 can each have separate wireless interfaces for interacting with the mobile device. In one embodiment, these wireless interfaces can be used with a wireless payment system, such as Apple Pay™ or Google Pay™. The wireless payment system can be used to transfer funds to the gaming machine that can be used for wager-based game play.

The door 1014 can allow secured entry access an interior of the cabinet 1008. Via this access, devices mounted within the cabinet, such as displays 1018, 1026; speakers 1020*a*, 1020*b*; bill/ticket acceptor 1022 or printer 1024 can be serviced and maintained. For example, a receptor configured to receive currency and tickets, coupled to the bill acceptor, can be emptied. The receptor is often referred to as a bill stacker. In another example, blank tickets can be added to the printer 1022 or paper jams can be cleared from the printer. When door 1014 is opened, the gaming machine can enter a hard tilt state where game play is disabled. Although not explicitly shown, the audiovisual input/output mechanisms of the gaming machine 1002 need not be limited to the illustrated displays 1018, 1026; speakers 1020*a*, 1020*b* and buttons 1032, 1034. Additional audiovisual input/output mechanisms may come in the form of touch-sensitive screens, haptic input/output devices such as vibrators, subwoofers, microphones for picking up verbal requests or audible indications of excitement by the primary player or adjacent other persons and so on. In one embodiment, the chair 1003 may be instrumented so as to detect not only when the primary player 1007.1 is seated on it, but also when that player is jumping up and down or otherwise moving in the chair due to heightened emotions. This detected movement can be fed back to the services providing network 1004 for adaptively learning what gaming combinations tend to provide more excitement and/or entertainment. With authorization by the primary player 1007.1, a microphone and/or motion detector on his/her mobile device 1006 may be activated to provide similar automated feedback.

In addition, a number of further devices (not shown) can be provided within the interior of the cabinet 1008. A portion of these devices is not visible through an aperture in the gaming machine cabinet 1008. For example, a gaming machine controller (GMC) which controls play of a wager-based game on the gaming machine can be found within the cabinet 1008. Typically, the gaming machine controller is secured within a separate lockable enclosure. Details of the gaming machine controller are described below with respect to element 1160 in FIG. 5.

As another example, a number of security sensors can be placed within the interior of the cabinet 1008. The security sensors (e.g., see 1140 in FIG. 5) can be configured to detect access to the interior of the gaming machine 1002. For example, the sensors can be configured to detect when the locking mechanism 1016 is actuated, the door 1016 is opened or a locking mechanism associated with the gaming machine controller enclosure is actuated. A power source, separate from an external power supply, such as a battery can be provided which allows the security sensors to operate and be monitored when the external power supply is not connected or stops functioning for other reasons.

In particular embodiments, the cabinet 1008 can have a sheet metal exterior designed to provide the rigidity needed to support top boxes, such as 1010 and light kits as well as to provide a serious deterrent to forced entry. For example, the sheet metal can be sixteen gauge steel sheet. Additionally, the door, such as 1014, can be backed with sheet steel in the areas around the displays. Other materials, such as wood, wood composites, can be incorporated into the cabinet and the example of sheet metal is provided for the purposes of illustration only.

Speakers, such as 1020*a* and 1020*b* (only two shown, but there can be more elsewhere disposed), can be protected by a metal screen. In one embodiment, a speaker, such as 1020*a* or 1020*b*, can include a subwoofer speaker portion. In general, a sound system associated with the gaming machine 1002 can include an audio amplifier and one or more speakers of various types, such as subwoofers, midrange speakers, tweeters and two-way speakers that also accept voice input.

If the main cabinet 1008 is entered, a "DOOR OPEN TILT" can be displayed halting game play and causing a "DOOR OPEN" event to be sent to the slot accounting system in 1004. In one embodiment, this message can be displayed on the main display 1018. These events can also be stored to the power hit tolerant memory. Upon door closure, the "DOOR OPEN TILT" will be replaced with a "DOOR CLOSED TILT" that can clear after the completion of the next game cycle. Additionally, a logic "DOOR OPEN TILT" can occur if the logic door is opened. The logic door is configured to be lockable independent of how the switch wiring is installed. The gaming machine 1002 can be configured to initiate the logic DOOR "OPEN TILT" regardless of whether or not a lock is installed on the logic door.

The displays such as 1018, 1012 and 1026, the speakers 1020, the printer 1022, the bill acceptor 1024, the card reader 1028 and the button panel 1030 can be used to generate a play of a wager-based game on the gaming machine 1008. Further, the primary display 1018 can include a touchscreen function. The touchscreen function can be used to provide inputs used to play the wager-based game. Some examples of wager-based games that can be played include but are not limited to slot games, card games, bingo games and lottery games. The wager-based games are typically games of chance and utilize a random number generator to determine an outcome to the game.

In general, the wager-based games can be classified as Class II and Class III games. Class II games can include bingo, pull tabs, lottery, punch board, tip jars, instant bingo and other bingo like games. Class III games can include but are not limited to slot games, black jack, craps, poker and roulette.

As described above, the wager-based game can be a slot game. The play of the slot game can involve receiving a wager amount and initiating a start of the wager-based game. A selection of a wager amount and a start of the wager-based game can be performed using buttons, such as 1032 and 1034, on button panel 1030. In addition, the button panel can be used to perform gaming functions, such as selecting a number of lines to play in a slot game, selecting the amount to wager per line, initiating a cash-out and calling an attendant. These functions will vary for different types of games.

In some embodiments, a touch screen function can be provided in or adjacent to (e.g., over) one or more of the displays, such as 1012, 1018 and/or 1026. The combination of the display and touch screen can be used to perform gaming functions that performed using the button panel 1030. Also, display and touch screen can be used to perform operator features, such as providing a game playback or a hand pay.

The play of wager-based game, such as a slot game, can involve making a wager and then generating and outputting a game presentation. The bet amount can be indicated for example in display area 1042. The game presentation can include a number of game features that vary from game to game. The game features provide variety in how the outcome to the wager-based is presented. For example, an award to the outcome of the game can be presented in a series of steps that vary from game to game. In some instances, a portion of the total award for a game can be awarded in each step. And as explained above, in some instances, locally-incremented pending prize amounts such as P1, P2, P3 can be displayed as digit sequences representing credits or monetary units and one or more of these locally-incremented pending prize amounts (e.g., P1, P2, P3) may moved into (summed and moved into) the credits accumulating counter 1040 of the player or machine when a winning game outcome is hit. When a pending prize amount is awarded, its corresponding meter is reset to a reset value. Such steps and their graphical presentation can be referred to as game features. In various embodiments, information associated with one or more of the steps can be stored to a power hit tolerant memory. The power hit tolerant memory is discussed in more detail with respect to FIG. 7.

As an example, a portion of a slot game outcome presentation is shown on display 1018. The slot game outcome presentation can include displaying a plurality of normal reel symbols, such as pointed to by reference 1038 (e.g., blazing sun symbol, wild card symbol, bonus symbol etc.). During the game outcome presentation, the symbols can appear to move on the display 1018 (e.g., vertically to simulate a rotating reel). In addition, symbols can be made to appear to move off the display 1018 and new symbols can be made to newly appear onto the display 1018.

Different combinations of symbols can appear on the primary display 1018 for some period of time, which varies for each instance of the wager-based game that is played. At the end of an action-filled presentation, the symbols can be made to appear to settle and reach a final position or spin outcome. Then an award associated with the game outcome is presented on the display. The total award for the game can be temporarily indicated in display area 1044 for example and then moved via transfer line 1039*c* into the credits accumulating counter 1040 of the player or machine. The total credits available on the gaming machine after the award can be indicated in display area 1040 while next pending prize amounts are displayed elsewhere (e.g., in the areas designated as P1, P2, P3 and/or 1044 and/or 1012*e*).

In particular embodiments, a portion of the award to the outcome of a game or spin can be presented as a bonus game or a bonus spin (e.g., a free spin). The portion of the award can be referred to a bonus award. The presentation of the bonus award can also be presented in steps where a portion of the bonus award is awarded in each step. These steps can be referred to as bonus game features. In some embodiments, information associated with the steps in the bonus game can be stored to the power hit tolerant memory. In various embodiments, components of the bonus game presentation can be presented on one or more of display 1018, 1012 and 1026.

More specifically in one embodiment, when a given spin takes place (e.g., indicated as such in one of display areas 1018, 1012 and 1026), a by-chance bonus awarding wheel 1012*b* is presented for actuation by the primary player 1007.1 (or by a casino dealer in case of a table game) and when actuated, it starts spinning. As the symbols of the spinning wheel 1012*b* in the primary display area 1018 start settling into a near-final outcome state, a relatively large horizontal announcement area 1012*h* may first indicate how close to a jackpot win is the state of the spinning wheel 1012*b*, and then when the wheel 1012*b* finally settles into its final outcome state, announcement area may indicate the win in area 1012*e* or how close the spin came (e.g., "Missed by one rung!"—not shown). Announcement area 1012*h* may also be used to indicate the winning of low frequency hands or symbol patterns (e.g., "Royal Flush Here!!"—not shown). After a payout, the relatively large horizontal announcement area 1012*h* may indicate the post-reset, new pending prize amount. Preferably, it will generally not display a play discouraging amount such as $0.

Next, referring to FIG. 2, further details of one embodiment of the network services providing portion 1004 and of gaming machine operations, including organization of plural machines as banks are described. It is to be understood that FIG. 2 does not merely depict a machine system. Rather FIG. 2 also depicts a socio-biological environment in which reactions of first players (e.g., 1062*a*) can affect second players (e.g., 1062*b*) and vise versa. The manner and timing used to provide certain types of messaging (e.g., reporting of a reset event) can affect the socio-biological environment of the players and bystanders (e.g., 1062*c*) found on the casino floor.

In FIG. 2, the illustrated gaming system 1050 includes three banks of gaming machines, 1052*a*, 1052*b* and 1052*c* with three side-by-side slot machines in each bank. The choice of three machines per bank is merely for purposes of illustration. A different number of side-by-side slot machines in each bank or back-to-back slot machines in each bank (not shown) could be used (e.g., 4, 5, 6 etc.). A factor to be considered however, is how many machines (or banks of such machines multiplied by the machines per bank factor) can be practically assigned to participate in each high frequency progressive jackpot pool (e.g., mini jackpot pool) without running into problems such as that of too many players all hitting a winning outcome in close chronological proximity of one another for a same high frequency jackpot pool. On the other hand, if too few such gaming machines are assigned to a high frequency progressive jackpot pool, the prize amount will remain relatively low and so too will the frequency of jackpot wins. One option is to also provide for locally-incremented prize amounts on the respective machines. Either one or both of the high frequency jackpot pools and the locally-incremented pending prize amounts may entice players to continue playing. A danger though, as mentioned above, is too quick of a recognition by some players that a prize amount reset event has occurred.

The network services providing portion 1004 includes a central determinations server 1054, a local progressives server 1056, a locally-incremented prizes control server 1057, a wide area progressives server 1058, a player tracking/slot accounting system server 1060 and ticket-in/ticket-out (TITO) server 1062. In gaming system 1050, all of the gaming machines in each bank, 1052*a*, 1052*b* and 1052*c*, are operatively coupled to the slot accounting system server 1060 and the TITO server 1062. However, for purpose of illustration it is assumed that only the gaming machines in bank 1052*a* are coupled to the central determinations server 1054. Further, it is assumed that only gaming machines in bank 1052*b* and display 1068 are coupled to the local progressive server 1056. Finally, it is assumed that only the gaming machines in bank 1052*c* are coupled to the wide area progressive server 1058. The communication couplings between the gaming machines in each bank and the servers 1054, 1056, 1058, 1060 and 1062 can be wired connections, wireless connections or various combinations/permutations thereof. Not all are shown in the schematic illustration.

In various embodiments, the central determinations server 1054 can be used to generate a controlling portion of the game played on respective gaming machines in bank 1052*a*. For example, the central determinations server 1054 can be used to generate random numbers (by any of a variety of RNG techniques including those corresponding to examples mentioned above) used to determine outcomes to the games played in bank 1052*a*. In another example, the central determinations server 1054 can be used to generate all or a portion of the graphics used during play of the games on the gaming machines in bank 1052*a*. For instance, the central determinations server 1054 can be configured to stream a graphical presentation of a game to a gaming machine, such as that of upper display graphics 1064*a* and/or of the gaming machine's lower displays. (Lower displays not numbered here because primary player 1062*a* is illustrated obstructing those further displays.) The streamed upper display graphics 1064*a* may include that which on occasion (e.g., randomly or pseudo-randomly) reveals an active special bonus situation (e.g., 'Possible Jackpot win Here' or 'Possible Large Local Payout Here'), reveals the awarding of a substantial prize (e.g., Jackpot !!! 1012*e*). The streamed graphical presentations can be output to respective displays on respective ones of the gaming machines and also to additional larger displays mounted on walls or other fixtures near the respective bank of machines. Because execution of gaming actions within the central determinations server 1054 takes priority over the updating of the displays (signages) on the external machines (e.g., those of bank 1052*a*), there may be a slight delay between when an outcome of a specific gaming action is internally determined in the central determinations server 1054 and when the displays (signages) on corresponding external machines (or signages on nearby additional displays) get updated to reflect the latest outcomes so that players can see them. This will be referred to herein as signage latency. Signage latency can vary as function of work load placed by higher priority operations on the data processing resources of the network services providing block 1004 and/or can be modified to spread news about winning hits over time so that patrons can more easily absorb the information.

Aside from signage latency there is also human latency 2045. Irrespective of how far behind are the signage update speeds 2043 from the meter update speeds 2044, a given player (e.g., 1062*b*) may fail to take notice at the instant it happens, of change in what is displayed at various positions on the various signage mechanisms (e.g., video monitors) for example because that player is focused on other positions (e.g., on completing a virtual scratch-and-win ticket—not shown). Thus that player (e.g., 1062*b*) may have last seen a posted pending prize amount as being $P(J,t_{h1})$=$78 and failed to notice that, due to a prize reset event amount the signage has later switched to a post-reset amount of $P(J,t_{h2})$=$18, where here J is the identity of the specific gaming machine and t represents a subscripted time point. Stated otherwise, due to various contextual effects (e.g., distractions, involvements in focus grabbing activities) human latency 2045 for recognizing changed prize amounts can vary and be based on paying attention to some parts of the posted prize amount but not others. For example, when last glancing at the exemplary first posted pending prize amount, $P(J,t_{h1})$=$78; the player may have committed to personal memory that the last digit in the sequence (it could be credits as opposed to dollars) was an "8". Then, when the player later glances up at the displayed post-reset amount of $P(J,t_{h2})$=$18, that player may be comforted by seeing that the last digit is still an "8" without immediately realizing that perhaps the more significant digits have changed. On the other hand, if the displayed post-reset amount had instead been $P(J,t_{h2})'$=$10, that player might take instant notice of the fact that the last digit had dropped from an "8" to a "0". One of the reasons that the "0" might stick out is because culturally it is recognized as a nice round number. Also some psychologists have postulated that the digit "0" is especially attractive to the human visual system and is thus taken special notice of Thus if one wanted to suppress instant recognition that a prize reset event has occurred, it can be advantageous to avoid displaying reset amounts that are round numbers (e.g., especially ones that end with "0" digits). In accordance with one aspect of the present disclosure, steps are taken to avoid repeated displaying (or reduce the probability of a displaying) of reset amounts that are round numbers or are otherwise attention-drawing and/or easily memorizable digit sequences (e.g., $1111, $6666, $8888). For example, certain repetitive digit sequences (e.g., $1111, $6666, $8888) draw attention to themselves due to optical patterns that tend to capture the attention of the human visual system.

In one embodiment, the central determinations server 1054 can be used to randomly generate numbers and/or other symbols used in a bingo type games played on the gaming machine in bank 1052*a*. These bingo type games are often referred to as class II games whereas traditional slot machines are referred to as class III games. In class II games, a draw of numbers (and/or other symbols) is made. The numbers/symbols can be mapped to a bingo card or equivalent, which the player purchases to play the bingo type game and which the player (e.g., 1062*b*) focuses on as the numbers/symbols are called or otherwise published. The announced/published draw of numbers/symbols can result in at least one winning game combination on the bingo type cards participating in the current bingo type game. In some games, the first player to recognize and call (or otherwise publicly indicate) his/her completion of a bingo like pattern wins the entire prize (a winner takes all rule for the first-in-time winner). In some other games, all the players who recognize and call their completion of a bingo pattern within a predetermined first time window after the last bingo number was announced, split the prize or all win the same prize amount. In yet other games, the machine system automatically determines who the winners are without need for player recognition and call indication. However, even under such rules and strict adherence to them, some players may feel they were cheated because everyone around them seems to have already won, they have not yet won and the currently displayed pending prize amount has reset to an easily recognizable and significantly low value (e.g., $P(J,t_{h2})'$=$10). Such players may become discouraged and walk away. In accordance with the present disclosure, for the sake of maintaining good customer relations and smooth running of casino operations, the casino may elect to effectuate a system of non-recurring digit sequences for the prize reset amounts. In one embodiment, the prize reset amounts are randomly varied over a predetermined range having predetermined minimum and maximum values. In the same or another embodiment, the more significant digits displayed for the prize reset amounts are randomly varied within a predetermined range while one or a few of the least significant digits (LSD's) are copied from the pre-reset posted amount. In the same or another embodiment, reset amounts that are round numbers (e.g., $50, $100) or are otherwise attention-drawing digit sequences (e.g., $1111, $6666, $8888) are avoided or at least have the probability of them being displayed, significantly reduced (e.g., notched out from an otherwise substantially continuous probability distribution function—as will be described for FIGS. 3A and 3B). It is to be understood that prize amounts are not necessarily displayed as monetary amounts and may be instead displayed in terms of number of credits (CRs) where the casino provides a posted exchange rate between CR's and dollars or another monetary denomination. For example, a posted exchange rate may declare that 10,000 CRs are worth $25. Players are often more willing to place wagers when expressed as CRs rather than as monetary values.

The central determinations server 1054 can be configured to repeat the number draws for the bingo type games at regular intervals. For example, number draws can be repeated every 20 milliseconds or according to a longer interval period. Players at the various gaming machines coupled to the central determinations server 1054, such as the players at the gaming machine in bank 1052*a*, can initiate bingo games which utilize the bingo numbers from a particular bingo number draw. The bingo numbers in the number draw can be mapped to a bingo card displayed on the screen of the gaming machine, such as on display 1064*a*.

Wins can be indicated by a winning pattern on the bingo card, such as four in a row or four corners. In response to a winning pattern on a bingo card on a particular gaming machine, the central determinations server 1054 can send a prize amount associated with the win to the specific gaming machine having the winning pattern. This prize amount can be displayed on the gaming machine and the credits (CRs) associated with the prize amount can be deposited into the credits accumulating counter 1040 of the gaming machine. For example, win of a bingo game on gaming machine 1064*b* can result in a prize amount being displayed on the main display. Further, the prize amount can be deposited as credits on the gaming machine 1064*b* such that the credits are available for wagering in additional game plays.

In one embodiment, the prize amount can be output to look like a slot game. For example, if the prize amount is one hundred credits (e.g., $P(J,t_{h1})'$=100 CRs), video reels can be displayed spinning on a main display of the gaming machine and a reel combination associated with a one hundred credits win in a slot game can be output to the display screen. If the outcome to the bingo game on a particular gaming machine is no award (e.g., because the player's call of bingo came after the strict adherence timing window closes), then the video reels can be displayed spinning and a reel combination associated with no award in the slot game can be displayed on the gaming machine. This process can be repeated on various participating gaming machines, as number draws for various bingo games are initiated and completed on the central determinations server 1054. However, as mentioned above, in some instances (e.g., based on detected context) and for the sake of maintaining good customer relations and smooth running of casino operations, the casino may elect to effectuate the appearance of substantially non-recurring (e.g., randomly varied) reset amounts.

The local progressive server 1056 can be used to generate one or more progressive prizes that are limited to a local group of gaming machines, such as only the gaming machines in bank 1052*b*. When games are played on the gaming machine in bank 1052*b*, an amount of each wager (a predetermined or variable fraction) can be contributed to one or more progressive prize pools that accumulate in a respective one of built-up contribution funds and reset replenishment funds 2020. The local progressive server can receive the contribution amounts from the gaming machines linked to the progressive game and can keep track of the prize amounts associated with the one or more progressive prizes. The prize amounts valid at around time t (e.g., $P(J_1,t)$, $P(J_2,t)$, $P(J_3,t)$, etc.) for the one or more progressive prizes can be output to displays on the participating gaming machines (e.g., identified as J1, J2, etc.) as well as to separate displays (signages) near the participating gaming machines.

The local progressive server 1056 can be configured to receive information regarding gaming events on the participating gaming machines. For example, the local progressive server 1056 can be configured to receive a notification from each of the participating gaming machines when a game outcome has occurred associated with a win of a progressive prize or of a locally-incremented prize amount. In other examples, the local progressive server can be configured to receive gaming information, such as when each game is played on one of the participating gaming machines, an amount of wagered for each game and when one or more types of game outcomes occur on each of the gaming machines.

The local increments server 1057 can be configured to automatically determine when and amounts of increments should be applied to locally-incremented pending prize amounts of respective individual gaming machines controlled by the server 1057. It can also be configured to automatically determine when and which currently pending prize amounts should be awarded to the player or to the accumulated credits (CRs) meter of a respective gaming machine based on type of game being played, its rules and recent gaming action outcomes. In one embodiment, the local increments server 1057 is also configured to automatically determine what reset value should be assigned to each of the local meters whose pending prize amounts have just been awarded to the player or to the accumulated credits (CRs) meter of a respective gaming machine where an award event has been declared. In one embodiment, the local increments server 1057 is further configured to determine how the replenishment funds (e.g., part of 2020) that replenish the local meters whose pending prize amounts have just been awarded should be funded. In an alternate embodiment, the task of controlling the funding of the replenishment funds (2020) is delegated to an artificial intelligence (AI) engine 2050 which operates to give players a sense of more evenly distributed fairness about the casino floor (e.g., by delaying the display of some wins and resets so they are not chronologically or spatially clustered close together).

Depending on predetermined rules for various types of wager-based games, the gaming information associated with gaming events on the one or more gaming machines can provide a basis for additional bonus scenarios. For example, a bonus award can be triggered on one of the gaming machines after a random number of games have been played on the gaming machines as a group. As another example, a bonus award can be triggered on one of the gaming machines after a particular game outcome occurs a random number of times on the participating gaming machines as a group, such as a particular combination of symbols appearing a random number of times.

The wide area progressive server 1058 is connected to the gaming machines in bank 1052*c* and display 1066. The wide area progressive server 1058 can be used to enable a progressive game played on gaming machines distributed over a wide area, such as multiple casinos distributed within a state or other such jurisdiction. Similar to the local progressive server 1058, when wagers are made, the wide area progressive server 1058 can receive contributions to the progressive prize from the participating gaming machines. The contributions can be recorded in the meters of the built-up contribution funds and reset replenishment funds unit 2020. The wide area progressive server 1058 can report these contributions to a remote device which tracks the total progressive jackpot. Further, if a progressive jackpot is won on one of the gaming machines to which it is connected, the wide area progressive server 1058 event can be reported to the remote device. Yet further, the wide area progressive server 1058 can receive a current progressive jackpot amount from the remote device. The current progressive jackpot amount can be reported on displays on the gaming machines participating in the progressive jackpot and/or nearby signage, such as 1068. In one embodiment, after a progressive jackpot amount is awarded, the subsequent reset amount has recognition suppression applied to it by way of one or more of techniques disclosed herein, including for example, adding a randomizing offset to an initial reset value, avoiding (selectively notching out) readily recognizable digit patterns such as rounded values or the like and copying the previous least significant digits (LSD's) of the previous pending prize amount into the corresponding LSD positions of the displayed reset amount. The copying of the one or a few (e.g., 5 or less) of the least significant digits (LSD's) of the correspondingly awarded prize amount prior to the reset into the digits sequence of the to-be-displayed reset amount can operate such that a person who recently gazed at and memorized only the few LSD's of the correspondingly awarded prize amount and then gazes back at just those few LSD's will not notice that the more significant digits (MSD's) have changed due to the reset. Thus recognition of the reset event is suppressed for such persons.

An exemplary display 1068 of yet another gaming machine or other display device (e.g., wide area display device) can have a digital sign controller 1070. The digital sign controller 1070 can have a network interface which allows it to communicate with a remote device, such as the wide area progressive server 1058. In this example, the digital sign controller 1070 can be configured to output information to display 1068 associated with the progressive game, such as a current jackpot amount. In some instances, due to differences between meter update speed (2044) and signage update speed (2043), the displayed as current jackpot amount may be delayed for various reasons, including intentionally so as to avoid the appearance of chronologically clustered and/or spatially clustered awardings of prizes.

In general, displays with digital sign controllers can be provided throughout a gaming environment, such as casino. The digital sign controller, such as 1070, can be configured to communicate with a remote device. The remote device can be configured to send information to the digital sign controller to output to a display. The information can include video, audio and picture data. Further, the remote device can be configured to send commands to the display, such as a command to output information to the display. In one embodiment, the wide area display devices (e.g., 1068) may provide announcements of when particular gaming machines (e.g., 1002) in the local area have awarded beyond a predetermined threshold number.

The slot accounting system portion of server 1060 can receive accounting information from each of the gaming machine in system 1050, such as an amount wagered for each game and amounts awarded on each gaming machine and/or the number of further extra gains awarded due to initially settled upon outcome combinations (e.g., K, Q, A, J) and follow up bonus award opportunities. The server 1060 can also receive information which uniquely identifies each gaming machine including a machine ID number and a current game being played on the gaming machine. The accounting information can be used for auditing purposes.

The player tracking system portion of server 1060 can track the game play of individual users. For example, a player can input account information into one of the gaming machines that is associated with a player tracking account that has been previously set-up. Based on the account information, a particular player tracking account can be located. The player tracking account can include information which identifies an individual user, such as user 1062*a* (User 1062*a* can be playing games at one or more of the gaming machines in bank 1052*a*.). The player tracking account information can include a player's name, address, phone number, gender, etc. It is to be understood that the graphics presentations on any given gaming machine can be structured for entertainment and heightened emotions and/or expectations of not only the primary player 1062*a* but also for that of nearby other persons 1062*c*.

In one embodiment, a player, such as user 1062*a*, can insert a player tracking card in a card reader (e.g., see card reader 1022 in FIG. 1). The card reader can read player tracking account information from the player tracking card, such as on a magnetic strip on the card, and send the information to the player tracking/slot account system server 1060. Based upon the received player tracking account information, the player tracking system portion of server 1060 can locate a player tracking account.

The player tracking account information can be input via other means on the gaming machine. For example, as shown in FIG. 1, the gaming machine 1002 may be able to communicate with a mobile device, such as 1006. Thus, in one embodiment, the gaming machine 1002 may be configured to directly receive player tracking account information from a mobile device. In another embodiment, the gaming machine 1002 may be configured to generate an input interface on a touch screen display that allows a player to input player tracking account information.

After the player provides account information and an account is located, the player tracking system can enter accounting information associated with a player's game play into the identified player tracking account, such as an amount wagered over time. As described above with respect to FIG. 1, the accounting information associated with a player's game play can provide a basis for awarding comps to the player. For example, based upon a player's previous game play, the player tracking system portion of server 1060 can send an amount credits to the gaming machine on which the player is playing. In another example, the player tracking system portion of server 1060 can send a command to a printer (e.g., see 1022 in FIG. 1) on the gaming machine on which the player is playing to print out a ticket. The ticket can be redeemable for goods or services or a discount on goods or services, such as a free meal or discount a meal.

As described above, each of the gaming machines can be coupled to a ticket-in/ticket out (TITO) server 1062. TITO server 1062 can be used to generate and validate instruments associated with a credit and/or cash value. One example of an instrument, which can be generated and validated, is a printed ticket. Another example is a digital instrument, such as a printed ticket stored in a digital form. In one embodiment, a digital instrument can be stored on an electronic device carried by a user, such as a mobile device carried by user 1062*a*.

As an example, when a printer, such as 1022, is employed in a "cash out," the gaming machine controller (e.g., see 1160 in FIG. 5) can contact a TITO server (e.g., see 1062 in FIG. 2) with a cash out amount. In response, the TITO server can generate a unique number, associate the unique number with a value and send the gaming machine a unique number. The unique number can be sent to a printer (e.g., see printer 1022 in FIG. 1). Then, the printer can print a ticket with the unique number, such as a unique number encoded in a bar-code, and a value of the ticket, such as five dollars.

When the ticket is later presented for redemption, the unique number can be used to validate the ticket. For example, the user 1062*a* can "cash out" at a first gaming machine, such as 1064*a* in bank 1052*a*, and receive a printed ticket with a unique number generated by the TITO server 1062. Then, the user 1062*a* can go to a gaming second gaming machine, such as 1066 in bank 1052*c*, and insert the ticket into a bill acceptor (e.g., see 1024 in FIG. 1). The second gaming machine 1066 can contact the TITO server 1062 and send the ticket information, i.e., the unique number read from the ticket, to server 1062. Then, the server 1062 can validate the ticket and send back to the second gaming machine 1066 an amount of credits to deposit on the second gaming machine. The deposited credits can be used for additional game play.

In these examples, the servers can include processors, memory and communication interfaces. Various gaming functions are associated with each of the servers, 1054, 1056, 1057, 1058, 1060 and 1062. The described distribution of gaming functions is for the purposes of illustration only. In alternate embodiments, combinations of gaming functions can be combined on the same server or repeated on different servers. For example, the central determinations server 1054 can also be configured to provide a local progressive to the bank of gaming machine 1052*a*. In another example, the local progressive server 1056 can be configured to provide a number of different progressive prizes for different groups of gaming machines. In yet another example, the player tracking system portion of server 1060 can be configured to provide bonusing features at each of the gaming machines.

In FIG. 2, while gaming machines, such as those of displays 1064*a*, 1064*b* or 1066, are operational, a primary player user such as 1062*a* or 1062*b* can engage in game play. Under some conditions, such as tilt conditions, game play can be suspended and an intervention by a casino-authorized operator, such as 1065, may be required. An operator intervention may require an operator, such as 1065, to be directly present at a gaming machine, such as that of display 1064*a*. For example, the presence of an operator may be required to access an otherwise locked interior of the gaming machine to clear a tilt condition. In other examples, an operator may be able to clear a tilt condition from a remote location via a near field or other communication coupling with the gaming machine (e.g., using a mobile device such as 1006).

In one embodiment, during game play, the gaming machine can award an amount above some threshold amount. Prior to receiving the award, an operator, such as 1065, can be sent to the gaming machine to have the player fill out a form for tax purposes. In the United States, this tax form is referred to as a W2G form. In addition, the operator may verify that the gaming machine was operating properly when the award was made prior to the player receiving the award. For example, if the gaming machine indicates a progressive jackpot has been won, the operator may check to verify the gaming machine was operating properly. In a hand pay, the operator, such as 1065, may provide an instrument redeemable for the jackpot amount.

As described above and in more detail with respect to FIGS. 1, 2, 7*x* and 8*x* an operator, such as 1065, may be required to be physically present at a gaming machine, such as 1064*a* and 1066, to clear a tilt condition and/or to deal with other customer needs or desires. For example, to clear a tilt condition, the operator, such as 1065, may have to access an otherwise locked interior of a gaming machine to clear a paper jam in a printer or a bill acceptor (e.g., see printer 1022 and bill acceptor 1024 in FIG. 1). In another example, to clear a tilt condition, the operator 1065 may have to access an interior of the gaming machine, such as 1064*a*, to add more tickets to a ticket printer or empty a note stacker associated with the bill acceptor. For some tilt conditions, the gaming machine operator 1065 may access a menu output on a main display of the gaming machine, such as 1064*a*, 1064*b* or 1066, to perform a RAM clear. RAM clears are described in more detail below with respect to FIG. 5. In yet another example, one or more customers may feel that they have been cheated based on their perception of when certain timing windows closed or certain prize amounts changed and they may wish to lodge complaints or disputes with the operator.

As earlier mentioned, the various data processing devices (e.g., 1054-1064*a*) in the network services providing block 1004 and in the individual slot or other software driven gaming apparatuses (e.g., 1052*a*-1052*c*) or combinations thereof are generally dependent on called upon and executed software programs (not individually shown) where the actual gaming action runs rapidly and is recorded on official "meters" within a secured part of the system. Non-official displays or other signages (e.g., 1068) may thereafter get updated on slower basis as system data processing bandwidth and/or other factors permit. The execution of the official gaming actions takes priority. A conventional installation of one or more software programs for carrying out the official gaming actions may proceed as follows. One or more software coding persons or code updating persons generate corresponding pieces of source code. The generated source code or codes are compiled by an automated compiler. Installable object codes produced by the compiler are transmitted to a build assembler. The build assembler creates an installation build from the received object codes and transmits the installation build to an appropriate automated software installer (not shown). At install time, the software installer automatically copies the to-be-installed object codes into one or more respective portions of the network services providing hardware 1004 and at the same time generates respective SHA-1 hashes of respective segments of the being-installed object codes. The generated SHA-1 hashes are automatically stored into corresponding records within a database server (not shown).

After installation, an automated software verifier may be activated and used for comparing hashes of the installed software segments (which should be the same as corresponding segments of the compiled code) against the respective hashes that had been stored in the database server. If all of the compared hashes match, then the installed software segments are deemed ready to be run (executed) within the network services providing hardware 1004 and/or in whatever destination data processing units (e.g., in respective ones of gaming apparatuses 1052*a*-1052*c*) they are predestined to be transmitted to by way of a secured transmission mechanism (not shown). In one embodiment, each time new or updated software is to be installed in the network services providing hardware 1004, a government official or other authorized agent/inspector authorized to do so, is called in to oversee the installation process and to obtain as an output of the software installer of its generated SHA-1 hashes in the form of a GLI certification letter that is in compliance with the latest government requirements and includes an unalterable copy of the SHA-1 hashes created for the respective segments of the received and installed object codes. In this way the integrity of big ticket jackpot runs may be preserved.

Thereafter, the government official/agent may return at any time to run the software verifier for the purpose of accessing respective segments of the installed object codes within the network services providing hardware 1004 and automatically generating SHA-1 hashes for those accessed respective segments of the installed object codes and then comparing the generated hash values against the SHA-1 hashes in the GLI certification letter to thereby verify that nothing has changed.

Casinos can attest to the fairness of their gaming machines (e.g., strictly adhering to the advertised game rules and procedures) by referring to the GLI certification letter and/or the periodic government inspections. Nonetheless, due to varying latencies and race conditions, some players may come to feel or otherwise perceive themselves as having been cheated. One example is illustrated in FIG. 2. First and second players 1062*a* and 1062*b* are playing a same progressive prize game (e.g., a mini-jackpot) whose current accumulated amount is displayed on a slow-to-update, large public screen 1068. According to the rules of the progressive prize game, a same fraction or same absolute portion amount (2011, 2012) of placed wagers is taken out of the initial ante amounts of each of the players (e.g., 1062*a* and 1062*b*) and contributed into a growing, main progressive fund 2020. Also according to the rules of the progressive prize game, whichever of the players (e.g., 1062*a* and 1062*b*) hits the jackpot first is to be awarded the entire amount of the currently accumulated funds in the main progressive fund 2020. Then the meter resets. Typically players are involved with the gaming actions displayed on their respective gaming machines (see the normal gaze angle 1007*a* in FIG. 1) and are not always paying attention to the respective digit sequences presented for each of the pending prize amounts (e.g., locally-incremented ones like P1, P2, P3 or jackpot amounts). However, every once in a while they may look around to see what the currently posted pending prize amounts are. If a reset event occurs just when some of the players are looking around and the posted reset amounts are easily recognizable as being reset values (e.g., $00, $10, $100), the observant players may become immediately discouraged and walk away. However, as mentioned above and in accordance with the present disclosure, recognition suppression techniques can be applied so that the reset amounts are not easily and immediately recognizable as being reset values. In one embodiment, special replenishment funds are built up on the side so that the utilized recognition suppression techniques do not violate jurisdictional rules or lead to long term fund insolvency. For example, if randomization or semi-randomization with notching is applied to an initially determined reset amount, the special replenishment funds should be refilled so as to support the occasional randomized resetting to a Max value (see 314 of FIG. 3A) and the more typical randomized resetting to a value near the Mean (see 312 of FIG. 3A). In one embodiment, a display timing control engine 2050 keeps track of meter speeds 2044 in an area of the casino floor and controls timing of when corresponding messages are displayed on the various signages (represented by signage speeds 2043) so that near simultaneous reset events in that casino floor area are not simultaneously reported. Instead a slight delay 2023 is introduced so that players (e.g., 1062*a*, 1062*b*) are not disheartened by seeing all opportunities for significant prize amounts disappear at the same time. Additionally, the display timing control engine 2050 may cause certain distracting graphics to be posted on the screens (e.g., 1064*a*, 1064*b*) when a reset event occurs (e.g., a jackpot hit) so that non-winning players are temporarily distracted from gazing at the screen area where the corresponding reset event is reported. Thus by distributing the reporting of reset events chronologically (optional delays 2023) within a given floor area and/or by distracting players to gaze at other screen areas so as to control perception timing (2045), the display timing control engine 2050 can prevent or suppress simultaneous mass recognition by all players in that area of a significant reset event (e.g., jackpot hit) and suppress an in-mass or cascading walk away in that area.

Figure 3A:
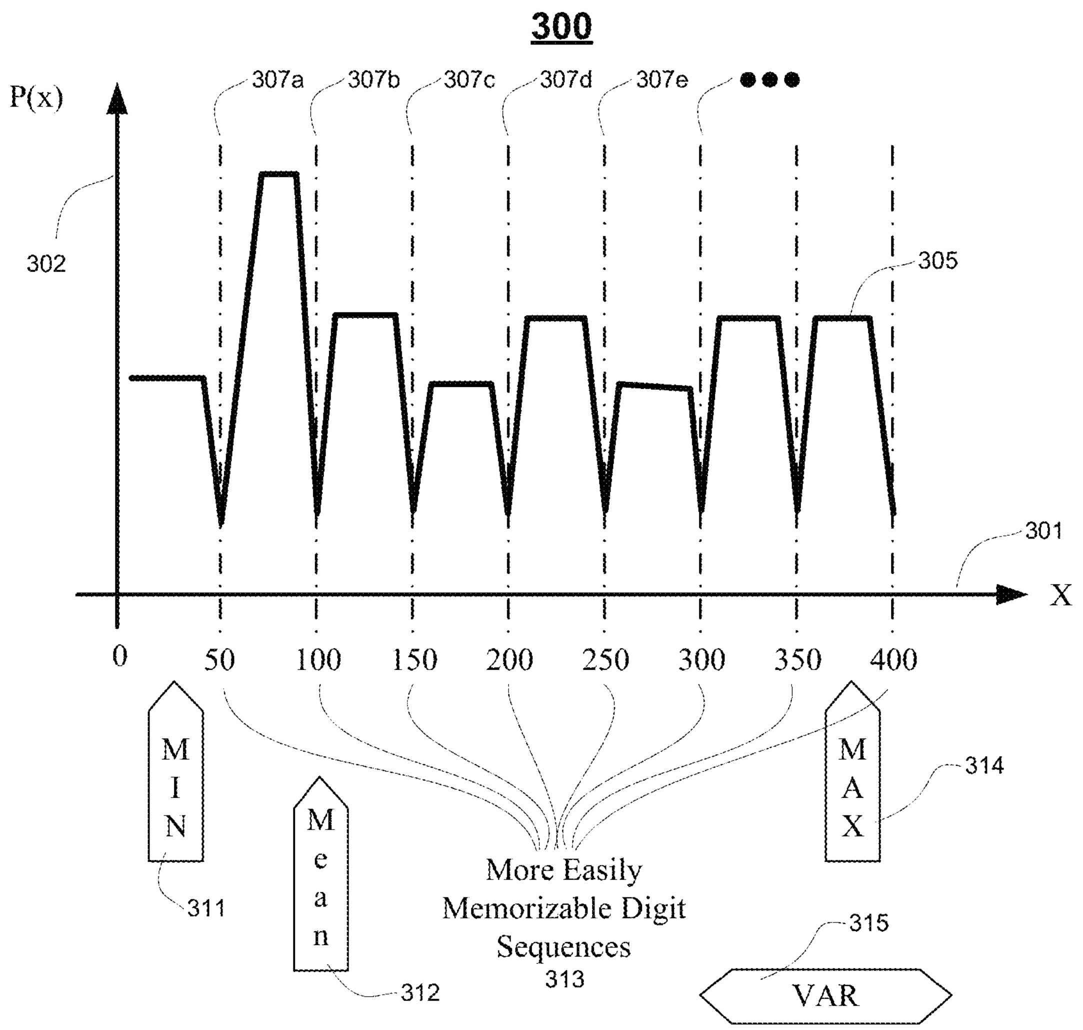
FIG. 3A schematically illustrates one possible probability distribution graph for a semi-random number generator in accordance with the present disclosure where the probability of generating one or more results represented by more easily memorizable digit sequences and/or more easily recognizable digit sequences (recognizable as corresponding to a reset event) is less than that of generating results represented by harder to memorize/recognize digit sequences.
Figure 3B:
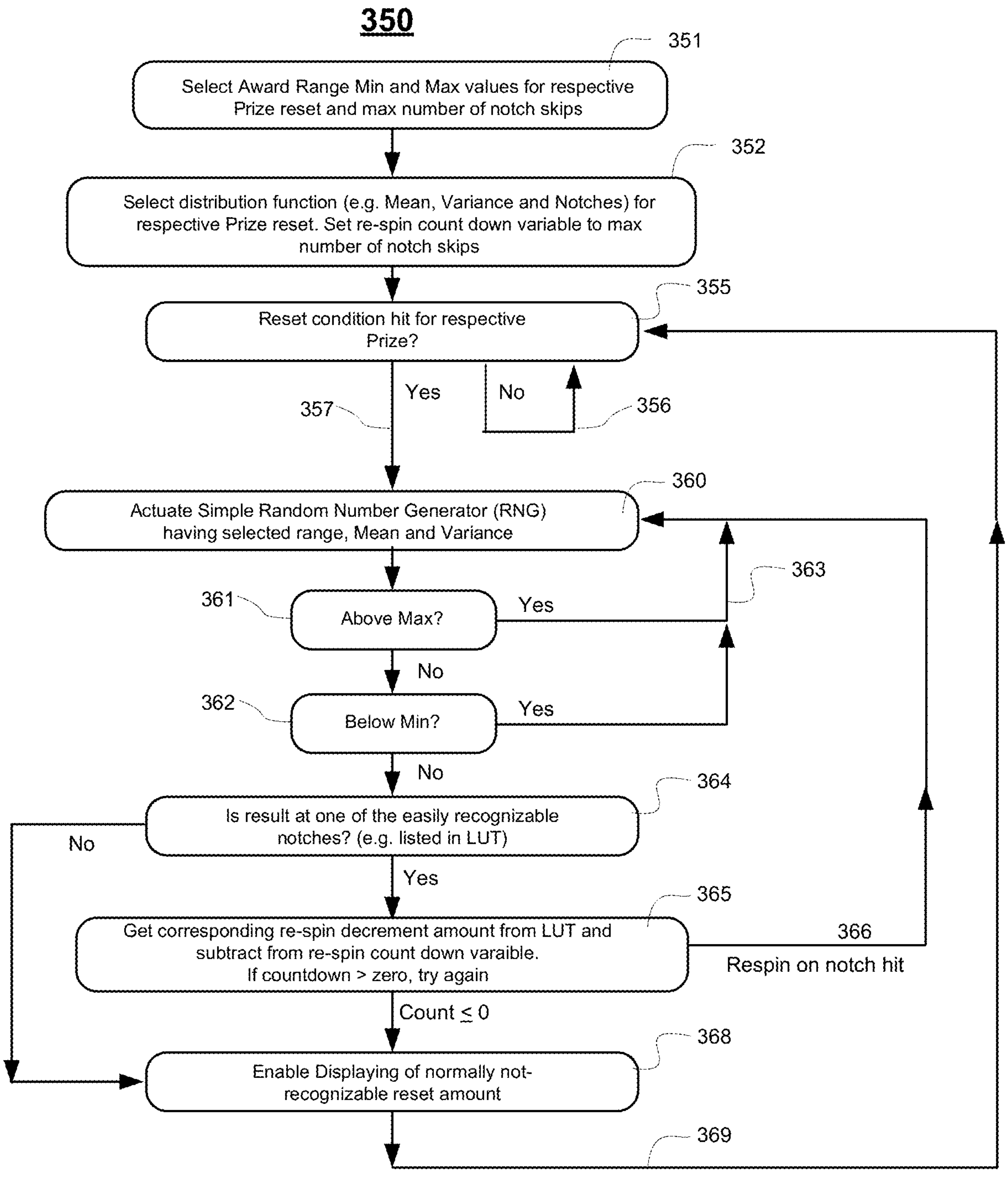
FIG. 3B illustrates a flow chart for one possible method of implementing a notched probability distribution such as shown in the graph of FIG. 3A.

Referring next to FIGS. 3A, 3B some exemplary embodiments are described in more detail. FIG. 3A depicts a graph 300 of a probability distribution function 305 for a semi-randomized generation of one of a plurality of possible numerical outcomes (e.g., discrete digit sequences) listed along the horizontal X axis 301. The vertical axis 302 indicates the respective probability P(x) for each of the possible outcomes listed along the X axis 301. Unlike a relatively smooth probability distribution function (e.g., a Gaussian function), the depicted probability distribution function 305 includes probability-reducing notches 307*a*, 307*b*, 307*c*, 307*d*, 307*e*, etc. carved into it. As may be understood from the graph 300, the presence of a probability-reducing notch (e.g., 305*b*) at a given one of the possible discrete numerical outcomes (e.g., at the corresponding output representing a reset value of $100) breaks the expected continuity or other normal trending of the relatively smooth probability distribution function and means that the probability of that outcome is substantially reduced relative to the expected continuity or other normal trending. Although not shown, if the notch goes down to the level of P(x)=0 that means that the corresponding numerical outcome is never generated. In the illustrated example 300, numerical outcomes having easily recognized and/or easily memorized digit sequences such as 50, 100, 150, 200, 250, 300, 350 have their probability of being generated substantially reduced by the presence of a corresponding notch 307*a*-307*x* (x being part of the alphabetical sequence here). Thus, by using a notch to probability distribution function such as shown at 305, a semi-randomized number generator can be implemented that preferably avoids producing easily recognized and/or easily memorized digit sequences (where the latter are represented as a set 313 of such more easily recognized and/or more easily memorized digit sequences). It is to be understood that the given examples within the set 313 of potentially easily recognized and/or easily memorized digit sequences such as 50, 100, . . . , 350 are merely examples. Instead of dollar denominations in the range of $0-$400, the horizontal X axis 301 could have depicted other monetarily denominated ranges. Alternatively it could have depicted potential reward amounts denoted as number of credits (CRs) where certain digit sequences representing the potential number of CRs are deemed to be more easily recognized and/or easily memorized than others and those certain digit sequences have their probability of being generated notched downward by a correspondingly inserted notch (e.g., 307*b*).

In one embodiment, the semi-randomizing number generator that has the notched probability distribution function 305, where placement and depth of the notches are input variables also has variable sliders for establishing a minimum possible outcome (MIN 311), a maximum possible outcome (MAX 314) and a Mean 312. Another slider 315 can set the variance (VAR) of the probability distribution function 305 when the notches are assumed to be all zero. The depth of the notches can optionally all be set to zero in which case the input-controllable number generator reverts to being a more simple random number generator (RNG) with the given MIN 311, MAX 314 and Mean 312. It is within the contemplation of the present disclosure that such a simple RNG can be used for generating reset values because, even without the notches, the probability of occurrence of the potentially easily recognized and/or easily memorized digit sequences is relatively low (e.g., less than 10%). In one embodiment, an initial reset value R0 is first determined deterministically and then a recognition suppression operation is applied to that initial reset value R0. The recognition suppression operation can include adding a random or semi-randomized offset +X to the initial reset value R0. In such a case, the MIN 311 variable can be set equal to R0. The MAX 314 variable can be set equal to the largest offset to be allowed (e.g., +R0/10) based on the deterministically established value of the initial reset value R0 and/or other aspects of the associated gaming action. In another embodiment, the recognition suppressed result can vary from below to above R0; in which case the Mean 312 is set equal to the initial reset value R0 while the MIN 311 variable and the MAX 314 variable are set to appropriate values about that initial reset value R0 based on the magnitude of R0 and/or other aspects of the associated gaming action.

FIG. 3B is a flow chart 350 of one embodiment for implementing a semi—randomized number generating that exhibits a notched probability distribution function of the kind represented in FIG. 3A. In step 351 it is assumed that the initial reset value R0 or an expected range for that deterministically established initial reset value R0 is already known (e.g., already determined). Based on that the corresponding MIN 311 variable and the MAX 314 variable are set to appropriate values as are the Mean 312 and variance (VAR 315). Moreover in step 352, the number of notches to be used is assumed to already have been determined as well as their respective placements along the X axis (301) and their respective depths below the probability value that would have been otherwise allocated to that respective, discrete result value X. The variable identified in step 351 as the maximum number of notch skips indirectly relates to the respective notch depths as will become apparent below. In one embodiment, a digital look up table (LUT) is programmed with one column representing the discrete result values X at which notches will be placed (e.g., 50, 100, . . . , 350) and with an adjacent second column containing values corresponding to the desired notch depths. A value of zero (0) in this second column indicates that the corresponding discrete result value X (and its corresponding, representative digit sequence; e.g., $00, $100) will always be avoided.

Step 355 represents an automatically repeated testing for whether a reset condition has been hit for a respective prize amount (e.g., for P1, or P2, or a jackpot). If No, then repeat path 356 is taken back to step 355. If Yes, then path 357 is taken to the randomizing step beginning at 360.

In step 360 the appropriate RNG for the respective prize amount that needs to be reset is actuated where that appropriate RNG as a correspondingly selected range, mean and variance based on an initially determined reset amount R0 and/or based on other aspects of the associated gaming action.

Step 361 test to see if the RNG produces a value above the allowed MAX 314 setting. If Yes, path 363 is taken so as to try again. Step 362 similarly tests to see if the RNG produces a value below the allowed MIN 311 setting. If Yes, path 363 is taken so as to try again.

In step 364, the RNG produced value is tested to see if it corresponds with one of the predetermined notch placements (e.g., as indicated in a correspondingly programmed LUT—latter not shown). It is to be understood that the predetermined notch placements need not be listed or only listed in a programmed LUT. Various testing functions can be applied to the RNG produced value to determine if it corresponds to a readily recognizable and/or readily memorizable digit sequence, for example by testing the RNG produced value to determine if it is divisible by five, ten or one hundred. If the answer to test step 364 is No, then control advances to step 368 where display is enabled for the normally not—recognizable reset value produced by the RNG.

If the answer to test step 364 is Yes, then control advances to step 365. In step 365 a corresponding respin decrement amount is obtained for the RNG produced value where this obtained amount corresponds to notch depth. For example, the corresponding respin decrement amount may be obtained from the second column of the above described programmed LUT. The obtained respin decrement amount is then subtracted from a respin countdown variable that had been initially set to the value of the maximum number of notch skips initialized in step 351. If the obtained respin decrement amount is zero (0) then the respin countdown variable remains unchanged, and therefore should remain positive so that control is next passed along the path 366 back to RNG actuation step 360 for another retry In other words, that corresponding RNG produced value is always skipped (always avoided). On the other hand, if the obtained respin decrement amount is greater than the respin countdown variable, the subtraction results in a negative number and control advances to step 368. If the obtained respin decrement amount is not large enough to drive the respin countdown variable negative then path 366 is followed until the respin countdown variable goes negative and then control advances to step 368.

As mentioned above, step 368 merely enables a displaying of the RNG produced value or a value derived from it. More specifically, in one variation, one or a few (e.g., less than 5) of the least significant digits (LSD's) of the RNG produced value are replaced by the corresponding LSD's of the corresponding prize amount prior to the reset event. In the same or another embodiment, a visual distraction is presented on one of the displays of the gaming machine to distract the player's gaze (e.g., 1007*a* of FIG. 1) away from the area where the prize reset is occurring. After execution of step 368, control continues along path 369 back to step 355 to await the next reset event for the corresponding prize amount (e.g., P1). It is to be understood that in one embodiment, multiple threads of process 350, each for a different prize amount (e.g., P2, P3, jackpot) can be simultaneously executing.

Figure 4A:
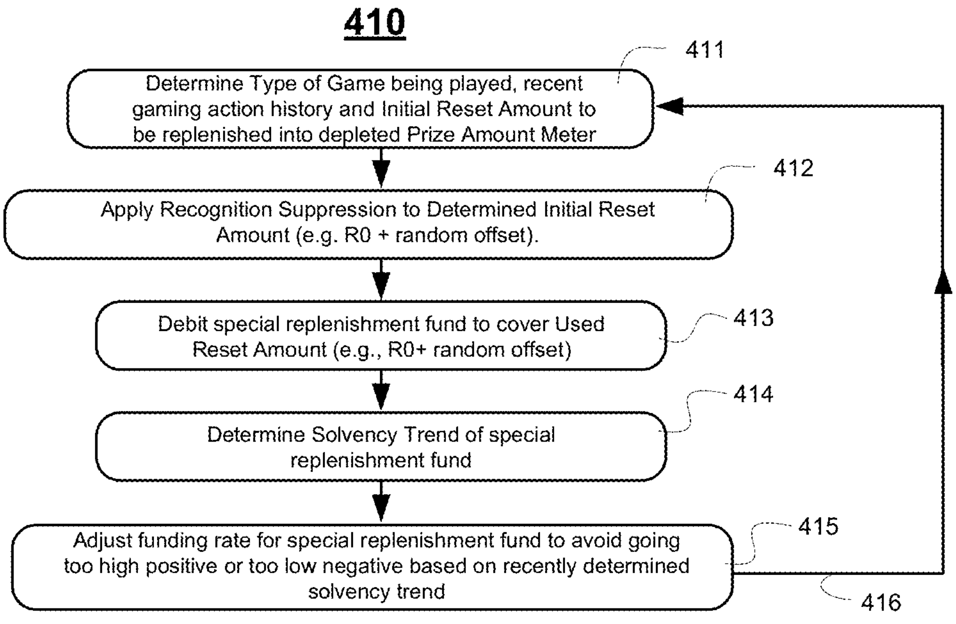
FIG. 4A illustrates a flow chart for one possible method of implementing recognition suppression while keeping a corresponding replenishment fund solvent.

Referring to FIG. 4A, shown is an encompassing method 410 that includes use of randomization to suppress quick recognition by players that a reset event has just occurred. In step 411 a determination is made as to the type of game being played (e.g., vertical paylines versus horizontal paylines), recent gaming action history for the given gaming machine (e.g., what was the last pre-reset, posted prize amount?) and an initial reset amount R0 that is deterministically planned to be replenished into a depleted prize amount meter that has just experienced a reset event.

In step 412, a selected recognition suppression operation is applied to the determined initial reset amount R0. An example of such a recognition suppression operation is that of using a simple random number generator (RNG) to generate a positive offset to be added to the determined initial reset amount R0. Another example would be that of using an offset value that can be positive or negative. Yet another example would be that of using a random number generator that has notching applied to its output. Yet a further example would be that of replacing one or a few of the least significant digits (LSD's) of the determined initial reset amount R0 (with or without a random offset added to it) with the corresponding LSD's of the pending prize amount just before the reset occurred.

In step 413, a corresponding special replenishment fund is debited by the used reset amount (e.g., R0 plus the random offset).

In step 414, an automatically maintained historical record of the special replenishment fund is analyzed to determine the recent solvency trend of that fund (where the recent history can be the last few minutes or last hour or other depending on the nature of the gaming action). The determined solvency trend may indicate that the fund is heading towards insolvency because recent prize replenishment operations are depleting the fund to quickly. Alternatively, the determined solvency trend may indicate that the fund is unnecessarily growing too large because recent funding contributions are outpacing the recent prize replenishment operations. Between these opposed results is the possibility that the special replenishment fund is being maintained at a relatively steady level and does not need corrective action.

In step 415, the determined solvency trend is used as necessary to increase or decrease the funding rate for the special replenishment fund to keep the latter from going too low or too high. Additionally or alternatively, the utilized recognition suppression algorithm is changed so that its resulting offset values have smaller or greater ranges to counter trending in the special replenishment fund of going too low or too high. In one embodiment, predetermined thresholds are used for determining what is too low and too high. The thresholds can be absolute values or relative percentages. Loop 416 returns control back to step 411 for repeat of process 410.

Figure 4B:
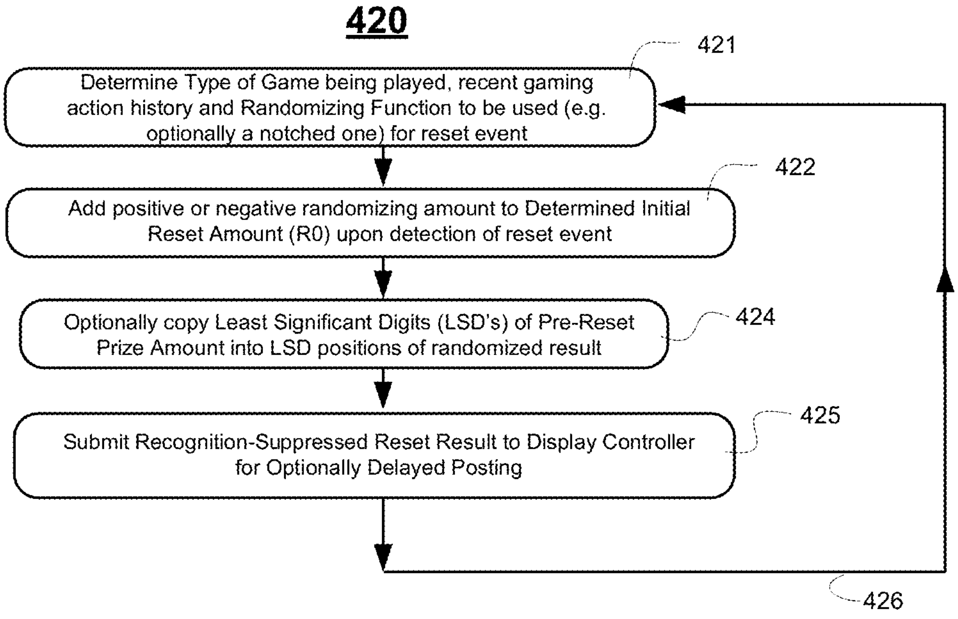
FIG. 4B illustrates a flow chart for one possible method of augmenting recognition suppression with copying of least significant digits (LSD's).

Referring to FIG. 4B, shown is a method 420 that includes use of replacement of least significant digits (LSD's) as part of the suppression algorithm. In step 421, the type of game being played is determined as well as recent gaming action history and the randomizing function to be used each (e.g., simple RNG versus a notched one) for handling a reset event for a predetermined one or more of prize amounts displayed by the gaming machine.

In step 422 and in response to detection of a reset event for the predetermined prize amount, a positive or negative randomizing amount is added to the deterministically determined initial reset amount (R0).

In step 424 and as an optional further suppressing of player recognition that a reset had occurred, one or a few (e.g., four or less) of the least significant digits (LSD's) of the pre-reset posted prize amount are substituted in for the corresponding randomized result (e.g., R0+random offset) so as to further suppress instant recognition that a reset has occurred. In some instances, especially when the prize amount reporting display uses casino credits (CRs) rather than monetary amounts, players focus on the last few digits of the displayed digit sequence for the pending credit amount to see if that pending prize amount has changed. If the last few digits do not change, then the players assume that the pending prize amount is unchanged. They therefore continue playing without looking back to notice that the more significant digits may have changed.

In step 425, the recognition-suppressed reset result (e.g., R0+random offset) is submitted to a display controller for displaying the recognition-suppressed reset result at a controller-determined time. In one embodiment, the display controller delays posting of the recognition-suppressed reset result (e.g., R0+random offset) by a short amount (e.g., a second or less) while first presenting a gaze distracting visual effect on one of the displays of the gaming machine. This may temporarily distract the player's gaze away from the area where the recognition-suppressed reset result (e.g., R0+random offset) is to be posted so that the player does not immediately recognize that the posted amount has changed. The player keeps playing and, when he or she finally looks at the posted amount and perhaps recognizes that it has been reset, the inertia of the current gaming action inhibits the player from walking away from the gaming machine. Loop path 426 thereafter returns control back to step 421.

Figure 3C:
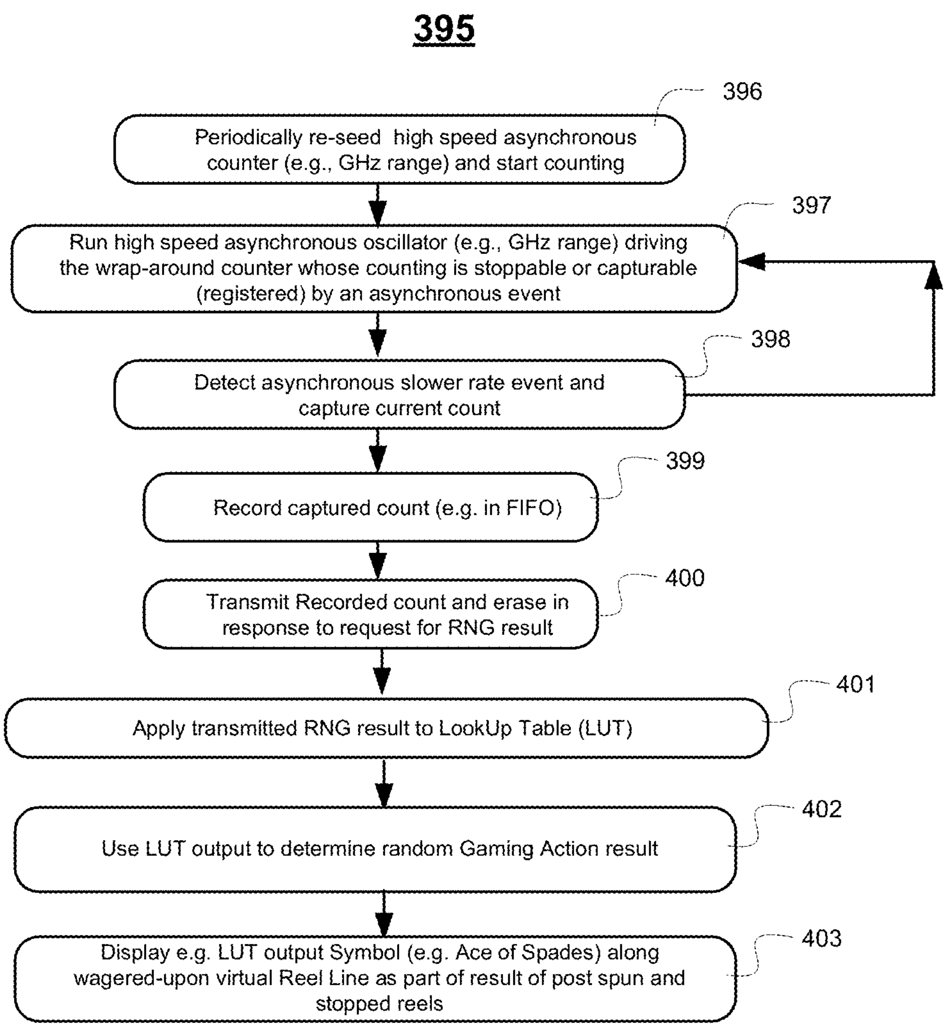
FIG. 3C illustrates an exemplary random number generation method and use thereof.

Referring to FIG. 3C, shown as a non-limiting example is a method 395 of using a simple random or pseudorandom number generator (RNG) for determining gaming action outcome. At step 396 a counter initializing value is determined as a seed for starting up a wrap-around digital counter driven by a high-speed oscillator. In one embodiment, a pseudorandom generator selects a subset of digits of the system real time clock. The selected digits are combined (e.g., summed) with a predetermined name seed and selected environmental noise measurement (e.g., background radio noise) to form the counter initializing seed. Then at step 397, the seeded counter begins its wraparound count while driven by a high-speed asynchronous oscillator (e.g., one operating in the GHz range). The counter may be a linear counter or a gray coded counter or account or otherwise wired for generating pseudorandom sequences.

At step 398, an external event that occurs asynchronously at a substantially slower rate (e.g., much slower than in the GHz range) is detected and used to trigger a register which captures the current counter value. The register captured value is stored in a temporary and secure memory such as a first-in first-out register (FIFO). In one embodiment, the FIFO is a circular one of limited size whereby unused recorded counts are overwritten by newly captured random count values. At step 400 a request is received for an orangey result and in response the count value at the output end of the FIFO is transmitted to the requester. The transmitted count value is erased from the FIFO.

In step 401 the relatively random RNG result value is applied to a statistics skewing look up table (LUT). The statistics skewing LUT differentially maps various ones of the input random numbers into respective output values or output symbols. Output values/symbols that are to have higher frequencies of occurrence are mapped to more of the input random numbers while values/symbols that are to have lower frequencies of occurrence are mapped to fewer ones of the possible input numbers. For example, in one embodiment the possible output symbols are the fifty-three possible cards in a normal playing card deck. The possible input number set may have thousands of unique members. At step 402, the output of the LUT forms at least part of the gaming action outcome. For example, the LUT output may represent an Ace of spades card. Plural an independent RNG's and LUT's may be simultaneously used for generating respective parts of a gaming action outcome having plural parts (e.g., a five card poker hand). At exemplary output step 403, the symbol represented by the LUT output is displayed for example along a wagered upon line of a set of virtual reel's that are first virtually spun and then slowed to a stop which settles on the predetermined gaming action outcome. Preferably, the RNG's and their associated LUT's are disposed in a secured central enclosure (e.g., 1004) where the graphics for the gaming action are also generated and the graphics are transmitted by secure communication links to the local gaming machines in the respective banks.

Figure 6:
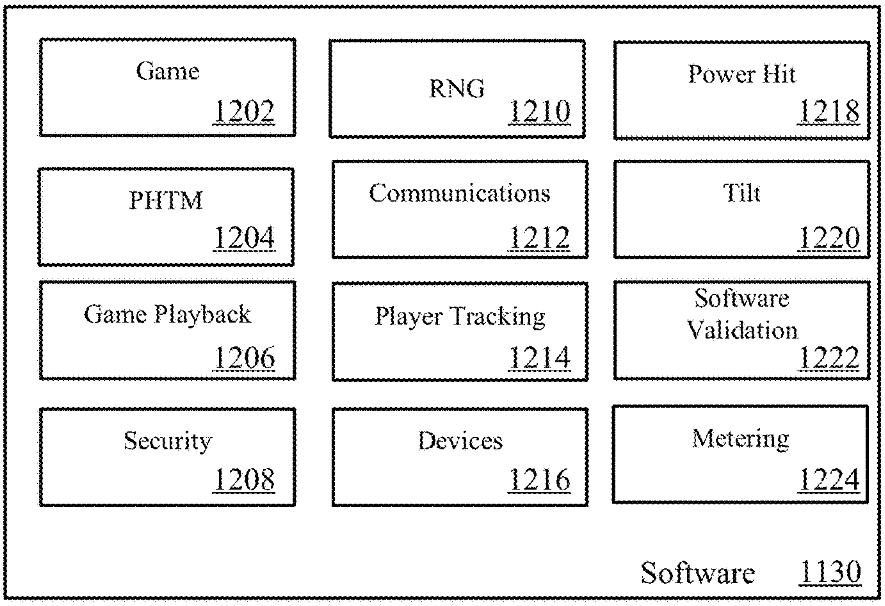
FIG. 6 illustrates a block diagram of gaming software in accordance with the present disclosure.

Referring to FIG. 5, details of a gaming machine controller that may be used to control the play of wager-based games including generating the game presentations and controlling the various gaming devices is described. FIG. 6 illustrates a block diagram of gaming machine components including a securely housed gaming machine controller (GMC) 1160. The GMC 1160 can be coupled to an external power supply 1146, displays such as 1018', 1012; etc., I/O devices 1134, external non-transient memories, such as a disk drive 1136, a power-off security device 1138, security sensors 1140, communication interfaces 1142 and meters 1144.

The external power supply 1146 can provide a DC voltage to the GMC 1160. The power supply can also provide power to the other devices in the gaming machine cabinet, such as I/O devices. Typically, the power supply 1146 is configured to receive power from an external power source, such as an AC voltage source. In some embodiments, an uninterruptable power supply (UPS) 1148 can be coupled to the power supply 1146. The UPS 1148 can be configured to provide back-up power for some time period in the event external power is lost. The GMC 1160 includes its own internal and thus securely housed battery 1124 (e.g., a rechargeable battery).

In a particular embodiment, the UPS 1148 communicates with the GMC 1160 on boot up and periodically to indicate power status and battery capacity of the UPS. If the UPS 1148 is not operational, this communication will fail and the game will display a soft tilt on the main game display, such as 1018', indicating that the UPS is not available. Under normal circumstances the UPS 1148 functions to condition the input power and ensure that the UPS battery remains fully charged. However, upon a power failure, the UPS 1148 in conjunction with the game platform will take one of two paths depending on the state of the UPS battery, which are described as follows.

If a power fail occurs and the UPS battery is more that 50% charged the GMC 1160 can immediately determine if there are credits on the machine (The threshold level can be a different percentage). If the game has no credits, the GMC 1160 can immediately hard tilt and become unplayable. The GMC 1160 can continue to run on battery power until either the battery level passes below 50% or power is restored to the game. If power is restored, the hard tilt is cleared and the gaming machine can become playable again.

If credits are on the machine, the GMC 1160 can allow game play to continue until the battery level reaches 50% charge. At that point, the GMC 1160 can complete a game in progress, cash out the player and begin an orderly shutdown. Allowing game play prior to shutting down allows the player to complete a game in progress and continue to remain on the game for a small period of time in case power is restored quickly. This keeps the game from tilting and the GMC 1160 cashing out the player for momentary glitches in power. It also allows some time for backup generators to come on line for a more serious power outage.

The power-off security 1138 can be configured to monitor the security sensors 1140 while power is off to the gaming machine, such as during a power failure or shipping. The power-off security 1138 can include its own processor, memory and power supply, such as the internal battery 1124. The power-off security device 1138 can report detected problems while the power was off to the GMC 1160 after power is restored. In some instances, a detected problem can cause a tilt condition. For example, a detected door open condition while the power was off may cause a tilt condition which has to be cleared by an operator. As another example, if the GMC 1160 can't detect the power-off security 1138, then the gaming machine can tilt.

The I/O devices 1134 can include the gaming devices that are directly or indirectly coupled to the GMC 1160 to provide the external interfaces that allow players to play the wager-based game(s) on the gaming machine. Examples of these gaming devices are described above with respect to FIG. 1. In some embodiments, a memory device 1136, such as disk drive and/or a flash drive, can be provided. As will be described in more detail below, the memory device 1136 can be used as a power hit tolerant memory (PHTM) or used to receive crucial data from another PHTM.

The communication interfaces 1142 can include wired and wireless communication interfaces, which use communication protocols, such as but not limited to Ethernet, Bluetooth,™ Wi-Fi, and NFC. A schematic indication of such a wireless communication interface 1046 is shown in FIG. 1. The remote servers (e.g., each server including one or more data processing units such as CPUs and appropriate memory such as SRAM, DRAM, Flash etc.) can form and provide the network services of block 1004 as described above with respect to FIGS. 1 and 2. The communication interfaces can be used to communicate with remote devices, such as remote servers, mobile devices in proximity to the gaming machine or other gaming machines. The GMC 1160 can be configured to support a variety of communication protocols over these communication interfaces.

In one embodiment, communications can be carried out with a back-end slot accounting system (SAS) (e.g., see network services block 1004 in FIGS. 1 and 2). In one embodiment, the SAS protocol uses a CRC redundancy check to ensure the integrity of messages going to and from the host. All type S, M, and G Long polls are CRC'd over the entire package including the address and command byte. The SAS engine can be configured to isolate the gaming code from the external communications. The SAS engine can be configured to only accept correctly formed SAS messages. Malformed, invalid or incorrect messages can be summarily dropped. Although CRC is mentioned here as one basis for data integrity validation, it is within the contemplation of the present disclosure to use of numerous other data and code integrity validation techniques including, but not limited to, hash matching techniques.

Messages that are valid can be translated into requests for the game player. The result of the message translation can be two-fold. First, the message is parsed and then evaluated for correctness and validity. If the message does not meet this criterion, it may not be translated and forwarded to the game player for a response, such as on display 1026 in FIG. 1. Second, no command, request or message from the external communication interface ever reaches any further than the SAS engine. This process ensures that erroneous signals or data will not adversely affect the game.

The meters 1144 can include hard meters, which are mechanical devices and meters maintained in software by the GMC 1160. In one embodiment, electronic digital storage meters of at least 10 digits that accumulate and store all the meters required can be used. For example, the number of games played since a RAM clear can be accumulated. In a RAM clear, critical memory can be cleared of data. Further, the number of games since the last power-up can be accumulated. As another example, games since the last door close can be accumulated.

Some other functions which may be tracked by a physical or software meter include but are not limited to attendant paid jackpots, attendant paid cancelled credits, bill in, voucher in (e.g., credit voucher), voucher out, electronic fund transfer in, wagering account transfer in, wagering account transfer out, non-cashable electronic promotion in, cashable electronic promotion in, cashable promotion credits wagered, non-cashable electronic promotion out, cashable electronic promotion out, coupon promotion in, coupon promotion out, machine paid external bonus payout, attendant paid external bonus payout, attendant paid progressive payout, machine paid progressive payout, non-cashable promotion credits wagered, number of progressives won, number of jackpots won, number of games won, number of games lost and total amount paid by attendant. Other meters can include main door open, logic door open, cash door open and stacker door open.

In a particular embodiment, software meters can be accessed from an operator menu by turning a key on the side of the gaming machine. The operator menu can be output on one of the displays (e.g., 1018', 1012'). All software meters can be cleared upon a RAM clear. In addition to the meters, the machine can also display the configured denomination, theoretical payout and actual payout. This information is accessible from the operator menu under the statistics screen. This information can be cleared upon a RAM clear event.

The GMC 1160 is preferably mechanically secured within an interior of the gaming machine. For example the GMC 1160 can be contained in a metal box. The metal box can include a secure entry, such as a hinged door, that is lockable. The openings for cables and wiring in the metal box can be purposefully designed to be as small as possible while still allowing proper electrical wiring standards regarding bend radius and connector strain. The locking mechanism for the metal box can be monitored by one of the sensors 1140.

The GMC 1160 can include a motherboard. The motherboard can be the only circuit card that contains control programs. The control programs include those used to control programmable operations within the GMC 1160. Other gaming devices, such as the I/O devices 1134, can include device specific control programs. However, these device specific control programs don't affect or alter the behavior of the control programs on the motherboard.

The mother board can include a chipset 1110. The chipset 1110 can include a Northbridge 1106, which is a memory controller hub, and a Southbridge 1108, which is an I/O controller hub. The Northbridge 1106 and the Southbridge 1108 can communicate via an internal bus 1116.

The Northbridge 1106 can be coupled to a memory bus 1112 and a front side bus 1113. The front side bus 1113 can couple on or more processors, such as CPU 1102, to the Northbridge 1106. The CPU 1102 can receive clock signals from clock generator 1104 via the front side bus 1113.

The memory bus 1112 can couple one or more graphics cards, which include graphical processing units (GPUs), to the Northbridge 1106. The graphics card or cards can be installed in the graphics card slot(s). The graphics cards can be coupled to displays, such as display 1018'. Further, the memory bus 1112 can couple one or more memory slots 1115, configured to receive volatile random access memory, to the Northbridge 1102. The CPU 1102 can communicate with the volatile memory in the memory slots 1115 and the graphics card in the graphics card slot 1114 via the memory bus 1112 and the front side bus 1113.

The Southbridge 1108 can be coupled to one or more PCI slots 1118 via PCI bus 1120. In various embodiments, the Southbridge 1108 can provide a variety of communications interfaces. The communication interfaces include but are not limited to IDE, SATA, USB, Ethernet, an audio Codec and CMOS memory. In addition, the Southbridge can communicate with a flash ROM (BIOS) 1126 and super I/O 1128 via the LPC (Low Pin Count) bus 1152. Typically, super I/O 1128 supports older legacy devices, such as a serial port (UART), a parallel port, a floppy disk, keyboard and mouse. Some of the gaming devices, such as the sensors 1140, can be coupled to the Southbridge 1108 via super I/O 1128.

The GMC 1160 can be configured to execute gaming software 1130 to control playing of a respective one or more wager-based games. On boot-up, a self-bootstrapping check of basic hardware, firmware and software integrity 1132 can be performed using firmware logic driven by the BIOS 1126. In a particular embodiment, an isolated and separate hardware device can be installed which includes the boot-up checking algorithms for the basic hardware, firmware and software integrity. The separate hardware device can be coupled to the Southbridge 1108.

In one embodiment, the gaming software 1130 can be stored on two compact flash cards, which are not conventional ROM devices. The verification mechanism can use one or more SHA-1 hashes, which produce a message digest of some length, such as one hundred sixty bits. Message digests can be stored on both compact flash memories. A public/private key covered and/or symmetric key covered algorithm with a key of some length, such as a 512-bit key can be used to encrypt and decrypt the message digests. If any errors are detected in the validation of the gaming software 1130, the GMC 1160 can automatically switch to a tilt mode and halt execution of gaming actions. The GMC 1160 can be configured to prevent programs deemed to be invalid (e.g., those failing periodic verification checks) from running.

When the gaming software 1130 is compiled and built, one or more of its respective code and/or data segments can be hashed using a hash algorithm, such as the SHA-1 hash algorithm. Other hashing algorithms can be used and SHA-1 is mentioned for illustrative purposes only. The resulting hash answers can form the hash digest. This digest, along with the start and stop values for the validation algorithm, can be encrypted by a private key. The key can be stored in a computer which is not connected to any network and which is physically stored in a secure location, such as a locked safe.

In one embodiment, prior to use, the public key can be installed in a power-hit tolerant memory, such as the NVRAM 1122 on the motherboard. This step can be performed when the gaming machine is manufactured. In another embodiment, the corresponding public and/or symmetric keys can be loaded from a secure mobile memory device, such as an authentication compliant USB device, in the field. In one embodiment, the USB port is only accessible when the enclosure which holds the GMC 1160 is opened. Without a proper public key, the machine will not operate.

When the game initially powers up, the BIOS 1126 can run a Power On Self-Test (POST) and checksum over itself and/or perform other boot-strapping integrity self-checking. If these tests fail, the game does not boot and an operator can be required to clear this tilt. If the BIOS self-test passes, the BIOS can retrieve the public key from NVRAM 1122 and can run a CRC over the retrieved key to ensure it is the correct key. The correct CRC answer can be stored on the BIOS. If the public key does not exist or if the public key CRC returns an incorrect answer, the game can halt and prompt the user to install the correct public key.

Once the public key is validated, the BIOS 1126 can test the integrity of the code stored in the system compact flash 1130 by using the validated public key to decrypt the SHA signatures for the data stored on the system compact flash 1130 and the start and stop sector identifiers indicating where the respective segments of data are stored on the compact flash for each corresponding SHA signature. The data can be stored between the start and stop sectors, inclusive. Unused sectors can be set to 0 (zero). The BIOS 1126 runs a low-level block-by-block integrity check using one or more SHA-1 hashes over the kernel and operating system (Boot and Root) partitions and compares the result to the decrypted file from the manifest. In one embodiment, the operating system can be Linux and the kernel can be a Linux kernel. If any of the hash values does not match, the game automatically goes into tilt mode.

If the values match, the BIOS 1126 can load the now-validated boot loader program and can relinquish control of the validation process to the boot loader. The boot loader can be executed by the operating system using CPU 1102. The procedure can validate the entire partition, not just the file structure. Thus any unused or unallocated areas of the partition can be tested for unintended programs or data.

Next, a file-by-file SHA-1 verification (or other hash based verification) can be performed over the pay table, assets, and player files. The resulting information can be compared against the decrypted results from the manifest file and/or from a secure encrypted database server (not shown). If the calculated answers match the decrypted answers, the GMC will proceed with the boot-up. If the hash answers do not match, the game tilts and requires operator intervention to clear.

In one embodiment, as an additional security measure, a compressed file system that is designed to be read-only can be used. The file system may not support or contain a write command or the ability to write to a file. The file system can be compressed so that it is not human-readable.

Each block of data in the file system can have a corresponding CRC stored with the block. When the block is read, the CRC is calculated and compared with the stored CRC. If the answer does not match, the file system can generate an error and the game tilts. Any changes, whether additions, deletions, or modifications, will change the CRC of the affected blocks and cause the game to tilt. This feature, in effect, monitors the integrity of the entire file system as well as the integrity of the media on a real-time basis. Although CRC is mentioned here as one basis for data integrity validation, it is within the contemplation of the present disclosure to use of numerous other data and code integrity validation techniques.

The SHA hash answers can be available on-screen and may also be accessed via the Gaming Authentication Terminal (GAT) interface. The GAT interface (not shown) can be provided as one of the I/O devices 1134 or within the super I/O 1128. The GAT interface can be configured to allow an operator to initiate an SHA-1 hash or an HMAC SHA-1 on-demand so that an operator (or other independent entity) can validate the integrity of the software 1130 at any time. In one embodiment, a nine-pin "D" connector is available to an operator or regulator (e.g., government authorized inspector) for access the GAT serial terminal.

Access to the GAT port requires opening of the main door. Further, it may require unlocking of the GMC enclosure. In one embodiment, a GAT port can be provided on the outside of the GMC enclosure. Hence, the GMC enclosure can remain locked while the GAT port is utilized.

As described above, the gaming machine can include a power hit tolerant memory (PHTM). For example, NVRAM 1122 (nonvolatile memory, for example a RAM coupled to battery 1124) can be used as a PHTM. The PHTM can be used to store crucial data, such as data generated during the play of a wager-based game. The PHTM can be configured to be able to quickly write the crucial data in response to a detection of an imminent power interruption. The CPU 1102 can be configured to detect a potential power interruption via the power interruption signal received from the power supply. The power interruption signal can indicate a fluctuation in the power.

Not all memory types may be suitable for use as a PHTM because their write times are not fast enough to store data between the detection of a potential power interruption and the power interruption. For example, some disk drives don't typically have fast enough write times for use as a PHTM. In one embodiment, a disk drive 1136 can be used. However, it requires that use of an uninterruptable power supply coupled to the disk drive 1136 and GMC 1160 to maintain power after the external AC power source is lost. Other types of memory with slower write times can be employed when an uninterruptable power supply is used.

Typically, a volatile RAM (random access memory) has a fast enough write speed to be used as a PHTM. However, after the power is lost, data stored in the volatile RAM is lost. To overcome this deficiency, a rechargeable battery, such as 1124, can be coupled to the RAM 1122 to provide persistence memory storage. This memory configuration can be referred to as a non-volatile RAM (NV-RAM). The battery power levels can be monitored so that it can be replaced as needed if it is no longer rechargeable. Alternatively or additionally, other forms of nonvolatile memory can be used including for example flash memory, phase change memory, etc.

In one embodiment, an NVRAM 1122 with a battery 1124 is shown inserted in one of the PCI slots 1118. The NVRAM 1122 can be used as a PHTM. In other embodiments, it may be possible to use a RAM inserted into one of the memory slots 1115 that is coupled to a battery. It yet another embodiment, it may be possible to use a high-speed USB connection to a memory storage device to provide a PHTM. As noted above, a hard disk, such as 1136, in combination with an uninterruptable power supply 1148 can be used as a PHTM.

In yet other embodiments, a GMC 1160 may utilize multiple memory storage devices to store crucial data. For example, the NVRAM 1122 can be used as a PHTM. However, crucial data can be copied to a non-PHTM from the NVRAM 1122 as needed. The copied data can provide a back-up of crucial data stored in the PHTM. Further, after crucial data is copied from the PHTM and the validity of the crucial data is verified, it may be deleted from the PHTM to free up space.

In one embodiment, crucial data can be stored in an NVRAM chip and in a high speed read/write compact flash. Crucial data such as RNG outcome, game recall, game state (credits, wager, winnings), and meters can be stored in NVRAM as files. Each file is hashed (MD5 or SHA-1 depending on the file) and the hash answer can be stored with the file and/or stored in encrypted form in a secure encrypted database server (not shown).

Additionally, in a particular embodiment, in NVRAM, the critical files can be kept in triplicate with each copy having a separate MD5 hash of the information. Prior to displaying each game outcome, this data can be rehashed and the three outcomes can be compared. If all three hash answers match, the data is deemed to be good and the game results are displayed to the player and a copy is stored in NVRAM. If two of the sets match, the non-matching set is deemed to be corrupt and it is replaced with a copy from one of the other two and the results are displayed to the player. If all three are different, memory can be deemed to be corrupt and a tilt can occur, halting play. The comparisons can occur continuously, each time the memory is updated, which may be multiple times during the course of a single play. However, a comparison can be performed at least once prior to displaying the game outcome.

To protect meters in the event of a power loss, various meters can be stored in NVRAM 1122. Thus, the meters are protected in the event of a power loss. The battery 1124 can be a lithium cell rated, based on the current draw of the NVRAM, to maintain the meters for at least 90 days. In one embodiment, the lithium cell can be rechargeable via the power supply 1146.

In particular embodiments, a game play history associated with recent games can be stored in the NVRAM 1122. This information can be retrieved from the NVRAM 1122 via an operator menu and output to a display, such as display 1018. In particular embodiments, a complete play history for the most recent game played and the nine prior games can be made available. A method involving game play history is described in more detail with respect to FIG. 10.

Various embodiments in accordance with the disclosure can include one or more of the following as components thereof: as a CPU (e.g., 1102) or other processor: an Intel LGA1150™ Socket set (H3 socket) populated by a Haswell G3420™ dual core; for the Northbridge hub (e.g., 1106): an Intel Q87 Platform Controller Hub (PCH)™ chip set; for the Southbridge hub (e.g., 1108): this part is integrated within Q87 PCH™ chip set; for the system memory Bus (e.g., 1112): a PCI Express x16 Bus; for system Memory Slots (e.g., 1115): Dual 200 pin SODIMM, Non-ECC DDR3, providing e.g., 8 GB total; for NV RAM (e.g., 1122): a PCIe x1 Interface, e.g., providing 8 MB Battery Backed SRAM; for a backup Battery (e.g., 1124): a CR2032; for FLASH ROM(BIOS) (e.g., 1126): the SPI FLASH, W25Q128™ using a LOTES ACA-SPI-004-K01 Socket™; for Super I/O interface (e.g., 1128): a Realtek F81866AD-I™; for Gaming Software (e.g., 1130 Software): corresponding Game Software stored on 32 GB 2.5" SSD; for Software Verification (e.g., 1132): OS Software stored on a 4 GB CF Card; for a Power Supply (e.g., 1146): the N2 Power XL375-12™ controller; for a UPS (e.g., 1148): the CyberPower CP1350™ controller.

For a slot game, the game play history can include credits available, credits wagered, number of lines played (when appropriate), bonuses won, progressive won, game winnings (credits won) and credits cashed out. For "pick" bonuses, the intermediate steps involving the player picks can be retained. In games with free spins, the initiating game is retained with all or, for cases where more than fifty free games have been awarded, at least the last fifty free games played. This gaming information can be displayed in the recall screens through standard text meters, screen shots, graphical display elements and textual representations of specific situations that occurred during game play. The game play history can illustrate unique game play features associated with the game in general and specific game features that occurred during the instantiation of a particular play of the wager-based game.

A gaming machine controller configured to generate a wager-based game in accordance with player selected volatility parameters is described with respect to FIG. 5. Gaming software used to generate the wager-based game is discussed with respect to FIG. 6. With respect to FIG. 6, a power hit tolerant memory (PHTM) configured to store crucial data generated from playing the wager-based game is discussed. The crucial data can include information associated with selected volatility parameters and wager-based games generated using the selected volatility parameters.

Figure 8:
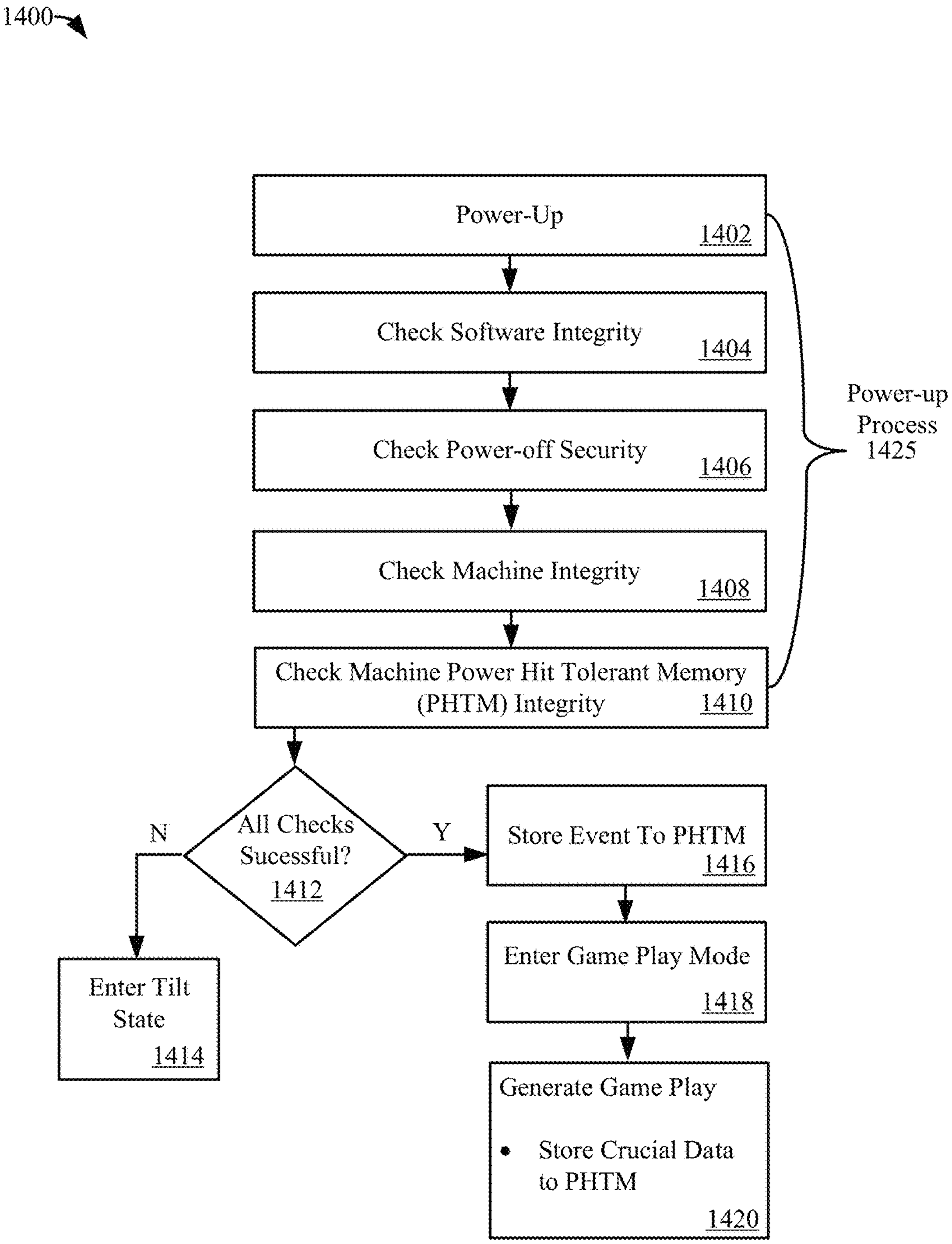
FIG. 8 illustrates a method powering up a gaming machine in accordance with the present disclosure.
Figure 9:
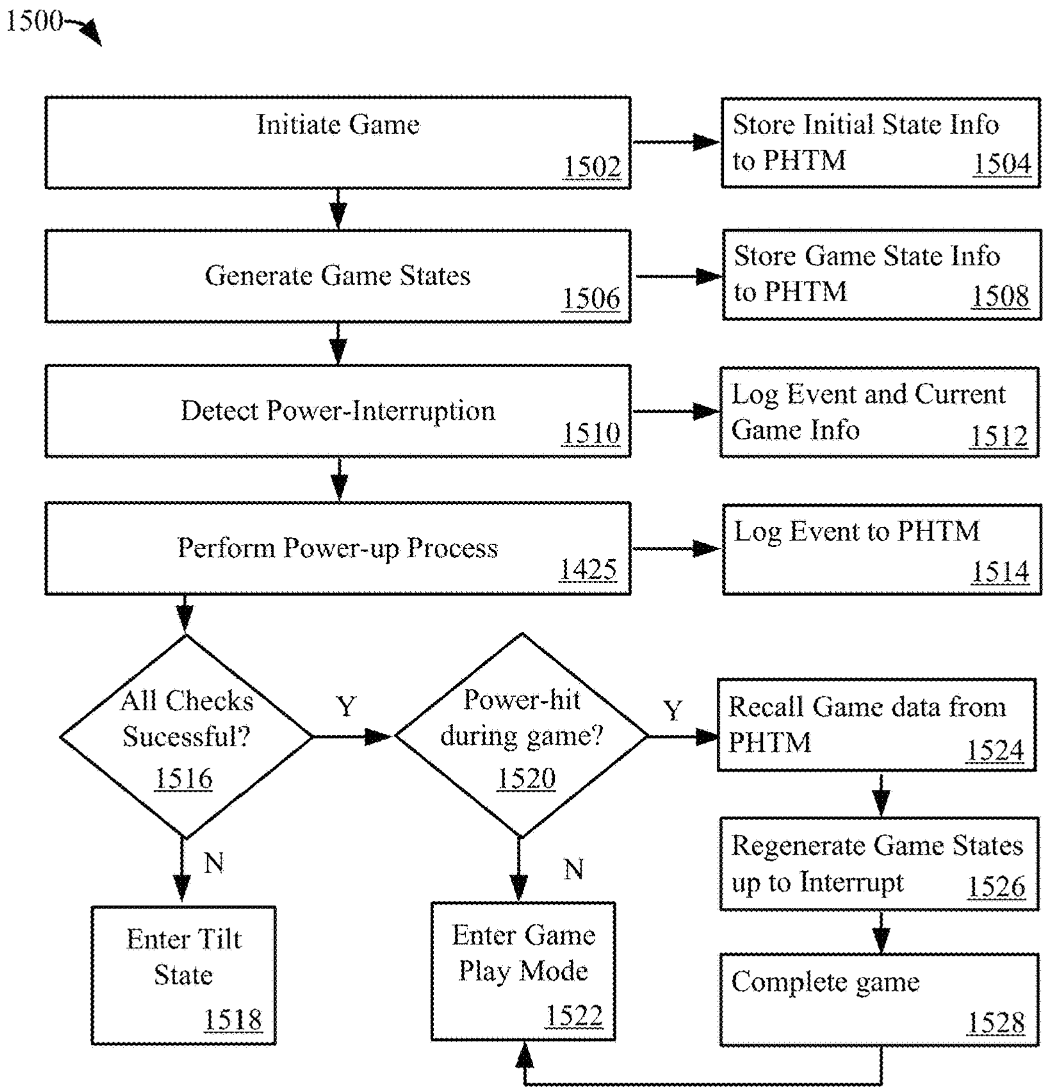
FIG. 9 illustrates a method for responding to a power interruption on a gaming machine in accordance with the present disclosure.

With respect to FIG. 9, a method for responding to a power interruption on a gaming machine, which utilizes the power hit tolerant memory, is discussed. With respect to FIG. 8, a method of powering up a gaming machine is described. Finally, with respect to FIG. 10, a method playing back a game, such as a wager-based game including a first primary game and a second primary game, previously played on a gaming machine is discussed.

FIG. 6 illustrates a block diagram of examples of gaming software 1130 that can be executed by a Gaming Machine Controller (GMC) 1160 in FIG. 5. The game software 1202 can be configured to control the play of the game. The play of the game includes determining a game outcome and award associated with the game outcome using the RNG software 1210.

The game software 1202 can be configured to utilize reel strips and/or wheels of chance with different properties. For example, virtual reel strips with different total number of symbols, different symbol combinations and different stopping probabilities. As described above, the game software may utilize different virtual reel strips in response to a selection of different prize structures involving scatter distributed symbols.

The award can be presented as a number of different presentation components where a portion of the award is associated with each presentation component. These presentation components can be referred to as game features. For example, for a video slot game, game features can involve generating a graphical representation of symbols moving, settling into final positions and lining up along a combination of different lines (e.g., paylines). Portion of the award can be associated with different lines. In another example, the game features can involve free spins and chance award of bonus wilds during the free spins. In yet another example, the game feature can involve generating a graphical representation of symbol and then actuating a mechanical device, such as wheel to indicate an award portion.

In a further example, a game feature can involve a bonus game where a portion of an award for a game is presented in a separate bonus game. The bonus game can involve inputting choices, such as a selection of a symbol. Similar to the primary game, the bonus game can include bonus game features where bonus game award is graphically presented in a number of different portions. A primary game can include game features which trigger different bonus games with different bonus game features.

As described above, game features and bonus game features can be stored to a power hit tolerant memory (PHTM). The PHTM software 1204 can be configured to manage the transfer of crucial data to and from the PHTM. Further, as described above, the PHTM software 1204 can be configured to verify the integrity of the data stored in PHTM.

In particular embodiments, the game 1202 has no knowledge of PHTM. Thus, the utilization of the PHTM can be totally abstracted from the game 1202 and contained in a shared object that is loaded at runtime. This shared object will also determine if the PHTM is available and how much memory space is available. If there is no PHTM, or it doesn't contain enough memory, the shared object can be configured to automatically use a disk file instead. This function may allow the game to be run in a windows environment and still have the ability to recover from a power hit.

One purpose of the PHTM 1204 is proper recovery from a power hit. In order to facilitate proper power hit recovery, numerous transition points can be built into the game 1202 where crucial data is stored to PHTM at each transition. The transitions can be implemented as states, which can be referred to as game states or game state machines. The states themselves can also be stored in PHTM so that on startup, after validating that the PHTM is not corrupt, the game 1202 can then check the current state that is stored. That state will then determine where the game will restart. The idea is that whenever a state transition occurs and is saved, the data needed to recover to that state has also been stored in PHTM.

Different approaches can be used in deciding when to save data to PHTM. In one embodiment, a thread runs in the background that constantly checks the data in memory against a copy of what's in PHTM as well as a force write flag. If the force write flag has been set or if it sees that the crucial data has changed, PHTM software 1204 writes it to the physical PHTM, updating the copy as well.

In another embodiment, the PHTM software 1204 can be configured to write all data directly to PHTM as it occurs. At certain times the PHTM software 1204 can be configured queue writes rather than committing them in order to make it an "all or nothing" write. This feature can be normally done for something that is going to cause a state change, a cash-out, etc. This feature can allow all the meters or crucial data associated with the game to be written at once, keeping the window of opportunity for corruption to the smallest amount of time possible.

In particular embodiments, multiple state machines can be used that are based on the overall game state machine. For example, separate "sub-state machines" can be used for critical functions that use external I/O devices, such as bill acceptors and printers. If the game 1202 restarts in a state that requires more granularity and has a different state machine such as a cash out or a ticket inserted state, it can switch to that sub-state machine to complete the actions and then return to the overall game state machine.

In particular embodiments, the sub-state machine concept can be used for areas of the game that are outside of the main game flow such as bonus games. For example, if the game is in a bonus game with bonus game feature including a free spin bonus round and the power cycles before all of the free spins have finished, the game will recover to the spin that was being executed when the power cycled and will continue from there. If the game is in a bonus game during a bonus game feature including a pick bonus, the game 1202 can recover to the point where the power cycle occurred. In particular, the picks that have already been made can be displayed and then the bonus game can continue from that point including receiving additional picks. Further, the game 1202 may be configured using the crucial data stored in the PHTM to regenerate on the display all or a portion of the game states prior to the power hit, such as the initial state of the game and game states that occurred prior to the bonus game.

The game playback 1206 can be used to display information associated with one or more game states of a wager-based game previously played on a gaming machine. As an example, a particular wager-based game can be initiated and played on the gaming machine. During game play of the particular game, crucial data associated with game states that occur can be stored to the PHTM. Subsequently, one or more additional games can be played on the gaming machine. Then, using crucial data recalled from the PHTM, game information associated with the particular game can be redisplayed on the gaming machine. The game information can include but is not limited to a) text information, b) screen shots that were generated during game play and c) a regeneration of all or a portion of a graphical game presentation associated with the particular game.

Typically, to access the gameplay back feature, the gaming machine has to be placed in a tilt mode where an operator menu is available. From the operator menu, using game playback software 1206, an operator can select a particular game for playback from among a plurality of games previously played on the gaming machine. To resume normal game play, the tilt mode can be cleared and the gaming machine can revert to a normal operating state. More details of game play back are described with respect to FIG. 10.

The security software 1208 can be configured to respond to information received from various security sensors disposed on the gaming machine and from the power-off security device (e.g., see 1138 in FIG. 5). For example, the security software 1208 can be configured to detect that a locking mechanism has been actuated on the gaming machine and then cause the gaming machine to enter a tilt mode. As another example, the security software 1208 can be configured to receive information from the power-off security device that the gaming machine door was opened while the gaming machine was being shipped. In response, the security software 1208 can cause the gaming machine to enter a tilt state. In yet another embodiment, the security software 1208 may not be able to detect a sensor, such as a sensor (e.g., see sensors 1140 in FIG. 5) which monitors a state of a door and in response enter a tilt state.

The RNG software 1210 can be configured to generate random numbers used to determine the outcome to a wager-based game. In one embodiment, a Mersenne twister random number generator (RNG) algorithm, which generates integers in the range [0, 2/\k-1] for k-bit word length with a period of (2/\19937)−1 can be used. It has a longer period and a higher order of equi-distribution than other pseudo-random number generators. The Mersenne Twister is also very fast computationally as it uses no division or multiplication operations in its generation process. It can work well with cache memory and pipeline processing.

In particular embodiments, the RNG cycles at seventy RNG cycles/second or above, such as equal to or above one hundred RNG cycles/second. This speed has been determined by engineers at the Nevada Gaming Control Board to be fast enough that it cannot be timed by the player. The tests showed that above seventy RNG cycles/second successfully hitting a specific outcome became sporadic, and the results were completely unpredictable at one hundred RNG cycles/second. An evaluation showed the variance in the contact mechanism of mechanical switches and the inherent variance in the "button press" detection circuitry, combined with the inability of a person to repeat a movement, provided enough ambiguity in the final registration of the button press to eliminate a player's ability to affect the payback characteristics of the game.

The RNG can be seeded using a plurality of variables. In particular embodiments, the RNG can be seeded by four variables that eliminate the same seed sequence from being used in more than one device, such as two gaming machines using the same RNG seed. The variables can be 1) absolute time, 2) time since the machine powered up, 3) machine number and 4) a random number from the kernel base RNG "/dev/urandom." The random number from the kernel can be associated with the Linux Kernel. This RNG "/dev/urandom" can be based on random occurrences, such as times between keystrokes, mouse movements, timing between interrupts, and hardware occurrences. These occurrences can be used to build and maintain an entropy pool.

The system protects against the same sequence in several ways. First, even if two games are powered on at exactly the same time, there is enough variability in the exact time that the time since power up should prevent any two games from having the same number returned from this function. Also, the "urandom" RNG is entropy based, and is self-seeded from environmental noise contained in the kernel, which makes it unlikely that two machines would ever have the same seed. Finally, the machine number (EPS number) is used as part of the seed. Because this number is used to uniquely identify the gaming machine on the floor, it should always be different from any other machine.

The communications software 1212 can be used to provide communications via the various communication interfaces and using various communication protocols. For example, the communications software 1212 can support the SAS protocol over wired or wireless communication interfaces. In another example, the communication software may allow the gaming machine to communicate with a mobile device via a wireless communication interface using a Bluetooth™ protocol.

The player tracking software 1214 may allow the GMC to communicate with a player tracking device installed on the gaming machine and/or directly with a remote server which provides player tracking services. For example, a player tracking device can be configured to communicate a GMC to transfer credits to and from the gaming machine. In another embodiment, the GMC can be configured to receive player tracking information from a card inserted in a card reader (e.g., see 1028 in FIG. 1) or via wireless communications with a player's mobile device. Then, GMC can communicate with a remote server to receive information associated with a player and send information associated with the player's game play on the gaming machine.

The devices software 1216 may be used to allow the GMC to communicate with various devices coupled to the gaming machine, such as I/O devices coupled to gaming machine. For example, the devices software may allow the GMC to communicate with a bill acceptor (e.g., see bill acceptor 1024 in FIG. 1) and in response add credits to the gaming machine. In another example, devices software may allow the GMC to communicate with a printer (e.g., see printer 1022 in FIG. 1) and in response cash out credits from the gaming machine in the form of printed ticket.

The power hit software 1218 can allow GMC to respond to power hits. For example, the power hit software can monitor the power supply and in response to a detection of power fluctuations update the PHTM with crucial data. In another example, when the gaming machine is power-up from a power hit, the power hit software 1218 can determine the power hit occurred during game play and initiate a restoration of the gaming machine to its state when the power hit occurred.

The tilt software 1220 can be configured to monitor sensors and gaming devices for tilt conditions. In response to the detection of a tilt condition, the tilt software 1220 can cause the gaming machine to enter a tilt state. Further, the tilt software 1220 can record tilt information to the PHTM.

For example, when a machine door open is detected, the game can tilt with a hard tilt that prevents play and disables the game. If the gaming machine includes a tower light, the tower light can flash to indicate that a door is open. Further, a "DOOR OPEN" indication can be displayed on the main display screen. Upon a detection of the door closing, the tower light can stop flashing and the "DOOR OPEN TILT" can be replaced with a "DOOR CLOSED SOFT TILT."

The door open tilt condition can be the behavior for all the machine doors, such as door 1014 in FIG. 1 or a CPU enclosure door (not shown). Additionally, the behavior may not change for multiple doors that are open. Thus, the "DOOR OPEN" indication can remain on, and the machine will be disabled until all the doors are closed. After the final door is closed, the tower light can go off, the game can become playable and the "DOOR OPEN" indication can be written over by a "DOOR CLOSED" indication which will remain until the end of the next game cycle.

A number of tilts can be generated that must be cleared by an attendant. These tilts may include clearing the condition with a key switch or, for tilts such as "PAPER OUT," the tilt may clear automatically after the attendant has remedied the malfunction. A low battery for a PHTM (e.g., see NVRAM 1122 in FIG. 5 or 1204 in FIG. 6) can be indicated by a "RAM BATTERY" tilt.

A "PRINT FAILURE" tilt can occur when there is a failure to print a ticket. In response, a printer hard tilt error can be issued and the description will indicate that the printer is offline. The tilt can be cleared when the printer is brought back online.

A "PRINT MECHANISM/PAPER JAM" tilt can occur for a paper jam. The game can indicate the paper jam has occurred and the printer is off-line (e.g., see printer 1022 in FIG. 1). This tilt can be cleared by clearing the jam and reinserting the paper into the printer.

A "PAPER OUT" tilt can occur when the printer runs out of tickets (e.g., see printer 1022 in FIG. 1). In response to detecting no remaining tickets, the game can display information indicating no paper is available and the game can be disabled. This tilt can be cleared when new printer stock is fed into the printer.

A defective storage media tilt can occur when an error is detected in a critical memory device, such as the memory storing the game software (e.g., see 1130 in FIG. 5), the memory storing the BIOS (e.g., see BIOS 1126 in FIG. 4) or the PHTM storing crucial data (e.g., see NVRAM 1122 in FIG. 5). A message indicating the validation error can be displayed. This tilt may require a "RAM CLEAR" to remedy the tilt condition. A "RAM CLEAR" can erase all meter, recall and other critical memory.

As described above, multiple copies of crucial data can be stored in the PHTM (e.g., see NVRAM 1122 in FIG. 5) and the GMC (e.g., see GMC 1160 in FIG. 5) can be configured to detect and correct copies of faulty data. When uncorrectable memory is detected in the PHTM or another device, it can result in a "CRITICAL MEMORY ERROR" tilt. Again, this tilt can require a "RAM CLEAR" to remedy the condition. Again, the "RAM CLEAR" can erase all meter, recall and other critical memory.

A "BILL JAM" can occur when the bill acceptor detects a bill jam (e.g., see bill acceptor 1024 in FIG. 1). The tilt condition can be displayed on the display, such as main display 1018 in FIG. 1. This is a hard tilt which disables the game until an operator clears the bill jam condition.

When a stacker is full, the game can displays a soft tilt error on the main screen. A "stacker full" may be displayed as a security measure. The stacker can be coupled to a bill acceptor and located in the main cabinet of a gaming machine (e.g., see bill acceptor 1024 in FIG. 1). The game can remain playable but will not accept any further currency or tickets. This tilt is automatically cleared once the stacker is emptied or replaced. When the stacker is removed, the game will be disabled and display a "STACKER OPEN" message. This tilt can be cleared when the stacker is reinserted.

The software validation software 1222 can be executed by the CPU to validate the various software components on the gaming machine. For example, hashes of memory blocks can be performed and compared to stored hash values (e.g., stored in encrypted form in a secure encrypted database server). This software can differ from the validation logic which is executed separately by the BIOS to perform validation functions.

The metering software 1224 can be used to update the hard meters and generate and update the soft meters. The metering software 1224 can be configured to store metering information to the PHTM (e.g., see NVRAM 1122 in FIG. 5). Examples of the meters which can be maintained are described above with respect to meters 1144 in FIG. 5.

FIG. 6 illustrates a block diagram of one embodiment of a power hit tolerant memory (PHTM) (Additional details of PHTMs are described with respect to NVRAM 1122 in FIG. 6 and PHTM 1204 in FIG. 6). Crucial information associated with the current game can be stored in 1302. Some examples of crucial information include but are not limited to a wager amount, a game outcome, one or more random numbers to determine the game outcome, information about game states and sub-states including the current game state, an amount won, initial credits and frame captures associated with one or more states. As described above, this information can be used to return the game to a current state after a power-hit. The one or more random numbers can be used to regenerate a particular game outcome associated with the random numbers and the wager amount.

After a game is completed, it can be moved to a game history partition 1304. The game history partition can store crucial data associated with a plurality of previously played games. For example, in one embodiment, the PHTM 1300 can be configured to store crucial data associated with the current game and nine past games. In another embodiment, the PHTM 1300 can store information associated with up to one hundred past games.

When the maximum number of games in the game history partition is reached, the software which manages the PHTM 1300 can be configured to delete the oldest game. This process can occur prior to starting the next game. For example, if a maximum of ten games are stored in the game history 1304, then prior to the play of the eleventh game, the oldest game can be cleared from the memory. In one embodiment, prior to the deletion of the crucial data associated with the oldest game, it can be copied to a secondary persistent memory.

In 1306, accounting information can be stored. The accounting information can include the metering information previously described above. In some embodiments, this information can be recalled in the event of a power failure.

In 1308, machine configuration information can be stored. Some example of machine configuration information can include but is not limited to Manufacturer ID, date of manufacturing, machine ID, operating system version, number of screens, cabinet type, hard disk capacity, PHTM capacity, number of PHTM banks, printer model information, touch screen model information, card reader model information, bill acceptor model information, display model information, jurisdiction information, casino name and other information, sales order #, manufacture information, logo's, etc. In one embodiment, the public key used in the code validation process can be stored here.

In game configuration 1310, game configuration information can be stored. The game configuration information can include paytable selection, game features selections, bonus selections, jackpot contribution setting, denominations, max number of paylines, number of game titles and game versions. A gaming machine can have many paytables with different holding percentages which can be selected by the casino. Similarly, selectable game features and bonus features can be provided.

In security 1312, security information can be stored. Security information can include information that lead to a tilt condition and the associated tilt condition. For example, if a door is opened, the security information can include when the door was opened, when game play was disabled, when the door was closed, when the tilt condition was cleared and when game play was subsequently enabled.

Figure 7:
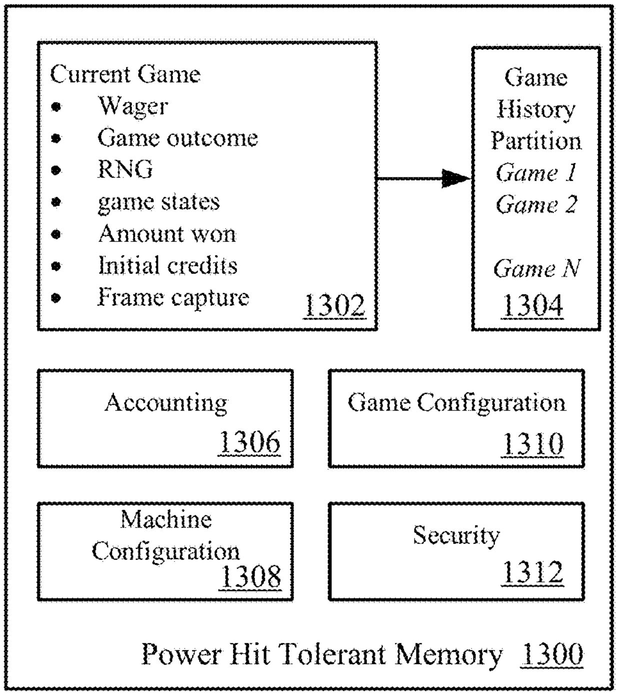
FIG. 7 illustrates a block diagram of power hit tolerant memory in accordance with the present disclosure.

FIG. 7 illustrates a machine-implemented automated method 1400 for responding to a power interruption on a gaming machine. In 1402, the gaming machine can begin a power-up process 1425. The power-up process can begin when a power switch in the interior of the gaming machine is turned on or when power is restored after a power interruption. In response to detecting external power is available, a signal can be generated which initiates a software integrity check on in 1404.

In 1404, the software integrity on the gaming machine can be checked. In particular embodiments, a public key/private key method and a "ladder of trust" can be used to verify control programs executed by the game controller. The initial rung of the ladder of trust can be the BIOS EPROM (see 1126 in FIG. 5), which may be a conventional ROM device. This conventional ROM device can load and can verify the initial code which continues the "verify then load" ladder of trust until the entire operating system and the game is loaded. This process was described above in detail with respect to FIG. 5.

In 1406, the power-off security device (see 1138 in FIG. 5) can be checked. The power-off security can monitor all the doors in the EGM. For example, the doors can use optical emitter/sensor pairs, but some might also use Hall-effect sensors. The system can be a standalone device with a CPU, RAM, NVRAM, sensors I/O board, and battery. The battery can be configured to last at least 30 days. It can be configured to record all critical events, such as power brown out, power black-out, main door open, logic (CPU) door open, bill acceptor door open, printer door open, top box door open and player tracking door open. These critical events may have occurred while the GMC was shut down and hence not monitoring the gaming machine for critical events.

In 1408, the machine integrity can be checked. For example, the security sensors on the gaming machine can be checked to verify all the doors are closed. Further, gaming devices, such as the printer and the bill acceptor, can be checked to determine the devices are operating properly (e.g., see printer 1022 and bill acceptor 1024 in FIG. 1).

In 1410, critical memory on the gaming machine can be checked. For example, the PHTM can be checked to make sure the stored information matches associated hash values. As described, a hash value can be generated for crucial data stored in the PHTM. The hash values can be stored with the crucial data. When the PHTM integrity is checked, new hash values can be generated and compared to the stored hash values.

In 1412, the GMC can determine whether all the checks were successful. If one or more of the checks are not successful, in 1414, the gaming machine can enter a tilt state and game play on the gaming machine can be disabled. Information about the tilt state can be output to a display, such as the main display on which a gaming presentation for a wager-based game is output.

In 1416, when all the checks are successful, event information associated with the successful power-up process can be stored to the PHTM. For example, the time that the gaming machine was enabled for game play can be stored to the PHTM. In one embodiment, as described above, this information can be used to generate a seed for a random number generator used on the gaming machine.

In 1418, the gaming machine can enter game play mode. Thus, the gaming machine is enabled to accept bills and tickets that are redeemed for credits on the gaming machine. After credits are deposited, the gaming machine can be used to make wagers on the game(s) available for play on the gaming machine. In 1420, the GMC can generate wager-based game play on the gaming machine and store crucial game play data to the PHTM.

FIG. 9 illustrates a method 1500 powering up a gaming machine. In 1502, a wager can be placed and a game can be initiated. In 1504, initial state information associated with the game can be stored to the PHTM. In 1506, game states associated with the game can be generated. In 1508, crucial data associated with the game states can be stored to the PHTM.

In 1510, a power-interruption can be detected. For example, the GMC can receive a signal from the power supply which indicates a power spike associated with a power shutdown has occurred. In 1512, the event can be logged to the PHTM. In addition, current game state information can be logged to the PHTM prior to the power failure. After power is lost, the GMC may no longer operate unless an uninterruptable power supply is available.

In 1425, the power-up process in FIG. 8 can be performed. In 1514, this event can be logged to the PHTM. In 1516, whether the power-up process is successful can be checked. In 1518, if the check is not successful, the gaming machine can be placed in a tilt state and information about the tilt state can be output.

In 1520, a check can be performed to determine whether the power-hit occurred during the play of a game and prior to completion of the game. This information can be stored in the PHTM. In 1524, when the power-hit occurred during the play of a game, data associated with the game including the current game state can be retrieved from the PHTM. In 1526, the game can be regenerated up to the current game state just prior to the power hit. In some embodiments, the gaming machine can be configured in the current game state without showing any information leading up to the current game state. In other embodiments, one or more game states prior to the current game state can be regenerated and output to the display.

In 1528, the current game can be completed. In 1522, the game can be enabled for game play. In 1520, when the power-hit didn't occur during play of a game, the gaming machine can be powered-up and enabled for game play in 1522.

Figure 10:
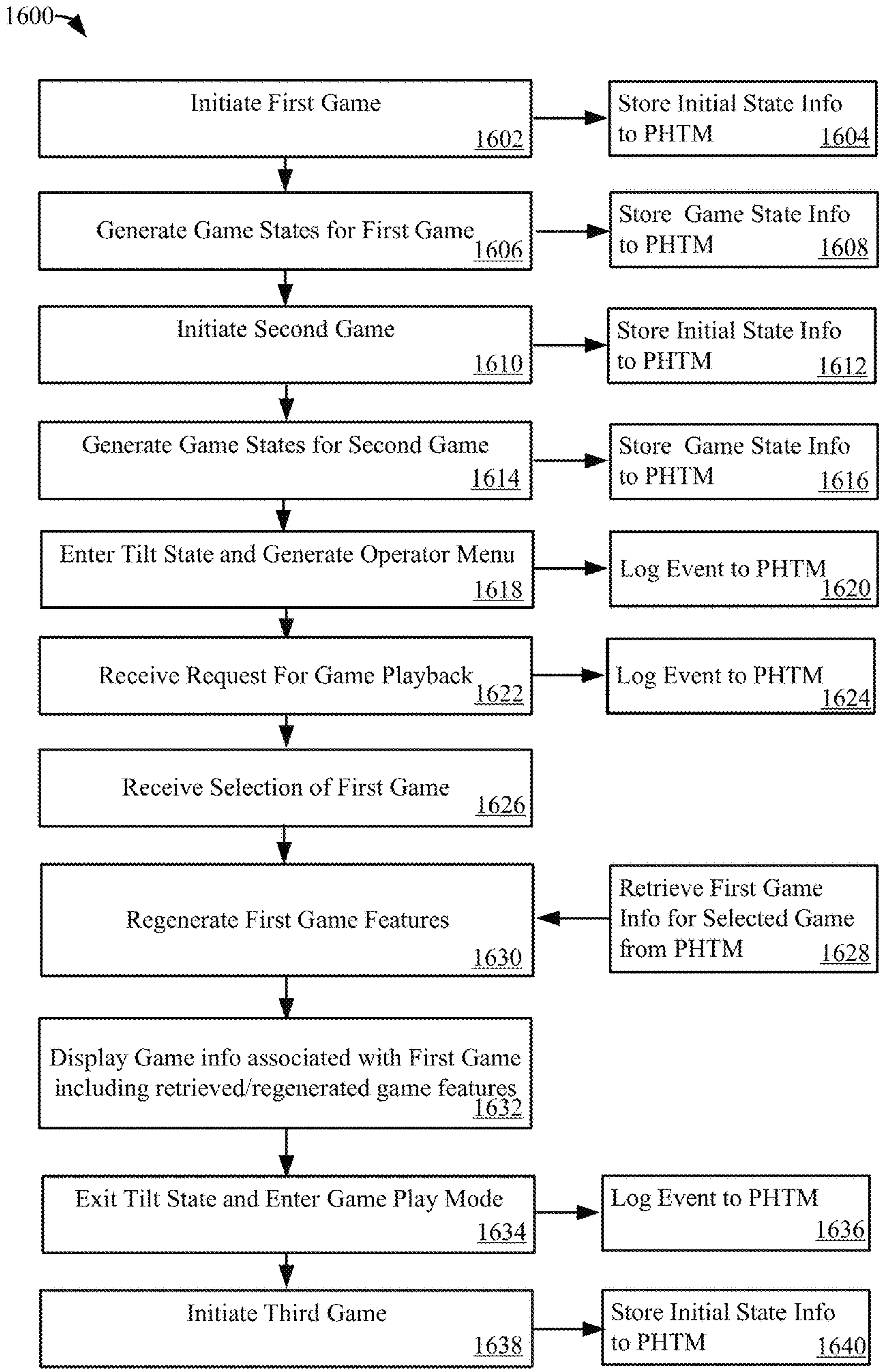
FIG. 10 illustrates a method playing back a game previously played on a gaming machine in accordance with the present disclosure.

FIG. 10 illustrates a method 1600 playing back a game previously played on a gaming machine. In 1602, a first game can be initiated on the gaming machine. In 1604, initial state information about the first game can be stored to the PHTM. In 1606, game states for the first game can be generated. In 1608, the game states can be stored to the PHTM. As described, in the event of a power-hit during play of the first game, the GMC (e.g., see GMC 1160 in FIG. 5) can be configured to restore the game and the gaming machine to a game state just prior to the power hit using information retrieved from the PHTM (e.g., see NVRAM 1122 in FIG. 5).

After the completion of the first game, in 1610, a second game can be initiated. The initial state information for the second game can be stored to the PHTM (e.g., see NVRAM 1122 in FIG. 5). In 1614, the game states for the second game can be generated and the second can be brought to completion. In 1616, the game state information for the second game can be stored to the PHTM.

In 1618, the gaming machine can enter a tilt state. In one embodiment, the tilt state can be initiated in response to the operator inserting and turning a key in a locking mechanism on the outside of the gaming machine cabinet. Then, an operator menu can be generated and output to a display on the gaming machine. In 1620, the tilt state event can be logged in the PHTM.

In the 1622, the gaming machine using an input device, such as a touch screen, can receive a request for a game playback. The game playback can involve displaying information about a game previously played on the gaming machine. In 1624, this event can be logged to the PHTM. In 1626, a particular previously played game can be selected from among a plurality of games with game information stored in the PHTM. In this example, the first game played is selected.

In 1628, game information associated with the first game is retrieved from the PHTM. Some examples of game information which can be retrieved includes but are not limited one or more of random numbers used to generate the first game, screen shots, award information, bet information, credit information and screen shots from one or more game states.

In 1630, first game features can be regenerated. These game features can include animations of the play of the game, which represent one or more game states, or static images representing different game states. The animations of the play of the game can be regenerated using random numbers associated with the original play of the first game.

In 1632, game information associated with the first game, including the retrieved screen shots, regenerated static images and regenerated animations, can be output to a display on the gaming machine. In one embodiment, the display can be the display where the game presentation for the wager-based game is output (e.g., see display 1018 in FIG. 1). In 1634, the gaming machine can exit the tilt state and enter game play mode. For example, to initiate this process an operator can turn a key in the locking mechanism and remove it from the locking mechanism.

In 1636, initiation of game play can be logged as an event to the PHTM. In 1638, a third game on the gaming machine can be initiated. In 1640, the initial state information associated with the third game can be stored to the PHTM.

Because such information and program instructions may be employed to implement the systems/methods described herein, the present disclosure of invention relates to tangible (non-transitory) machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Although many of the components and processes are described above in the singular for convenience, it will be appreciated by one of skill in the art that multiple components and repeated processes can also be used to practice the techniques of the present disclosure. As used herein, the term “and/or” implies all possible combinations. In other words, A and/or B covers, A alone, B alone, and A and B together.

While the present disclosure of invention has been particularly shown and described with reference to specific embodiments thereof, it will be understood by those skilled in the art that changes in the form and details of the disclosed embodiments may be made without departing from the spirit or scope of the present teachings. It is therefore intended that the disclosure be interpreted to include all variations and equivalents that fall within the true spirit and scope of the present teachings.

What is claimed is:

1. A machine-implemented automated method of suppressing recognition by users of one or more gaming machines that a prize amount reset event has taken place for one or more of the gaming machines, the machine-implemented automated method comprising:

detecting by use of one or more processors that a chance-based awarding of a displayed communally winnable and generally-incrementing prize amount has taken place for one or more of the gaming machines such that a corresponding meter needs to be reset before wagering resumes using a next-specified amount by the corresponding meter, the method further comprising:

deterministically determining by use of one or more processors, an initial reset amount for the corresponding meter in response to the detecting of the chance-based awarding;

altering by use of one or more processors, the initial reset amount to one whose to-be-displayed digits sequence is at least one of being less easily recognizable by the users than the initial reset amount as constituting a reset amount and having a less attention attracting pattern of its to-be-displayed digits sequence than that of the initial reset amount whereby users viewing a display that presents the digits sequence of the altered reset amount will not as easily recognize from the viewed display of the altered reset amount as compared to that of the initial reset amount that a reset event has occurred; and causing through use of one or more processors, a displaying on one or more corresponding prize amount displaying displays of the digits sequence of the altered reset amount.

2. The method of claim 1 wherein the altering includes applying a random or semi-random offset to the initial reset amount.

3. The method of claim 2 wherein the semi-random offset is applied and the semi-random offset is generated using a notched probability distribution function having selectively picked notch points of continuity-interrupting values of reduced probability for one or more prize amounts whose displayed digit sequences would be more easily recognizable as potentially being a reset amount than the points that are not notched.

4. The method of claim 3 wherein the displayed digit sequences represent a number of corresponding casino credits (CRs).

5. The method of claim 3 wherein the selectively picked notch points include prize amounts whose representative digit sequences are numbers divisible by ten.

6. The method of claim 3 wherein the selectively picked notch points include prize amounts whose representative digit sequences are ones that draw attention to themselves due to eye attracting digit patterns.

7. The method of claim 1 wherein the altering includes copying one or a few of least significant digits (LSD's) of a correspondingly awarded prize amount prior to the reset event into corresponding positions of the digits sequence of the to-be-displayed reset amount so that a person who has recently memorized only the few LSD's of the correspondingly awarded prize amount and then gazes back at those few LSD's will not notice that the more significant digits (MSD's) have changed due to the reset event.

8. The method of claim 1 and further comprising:

after said enabling of displaying on the display of the digits sequence representing the altered reset amount, delaying the displaying of the corresponding digits sequence representing the altered reset amount.

9. The method of claim 8 and further comprising:

between said enabling of displaying and said delayed displaying, inserting an intervening insertion of a distracting optical effect that diverts a player's gaze away for an area of the display where the corresponding digits sequence of the altered reset amount are being posted.

10. A non-transitory computer-readable storage storing instructions for one or more digital data processors, the stored instructions being applicable for suppressing recognition by users of one or more gaming machines that a prize amount reset event has taken place for one or more of the gaming machines, the stored instructions causing:

at least one of the processors to detect that a chance-based awarding of a displayed prize amount has taken place for one or more of the gaming machines and a corresponding meter needs to be reset;

at least one of the processors to deterministically determine an initial reset amount for the corresponding meter in response to the detecting of the chance-based awarding;

at least one of the processors to alter the initial reset amount to one whose to-be-displayed digits sequence is at least one of being less easily recognizable by the users than the initial reset amount as constituting a reset amount and having a less attention attracting pattern of its to-be-displayed digits sequence than that of the initial reset amount whereby users viewing a display that presents the digits sequence of the altered reset amount will not as easily recognize from the viewed display of the altered reset amount as compared to that of the initial reset amount that a reset event has occurred; and at least one of the processors to supply the altered reset amount to a display controller, thereby enabling a displaying on one or more corresponding prize amount displaying displays of the digits sequence of the altered reset amount by the display controller.

11. The non-transitory computer-readable storage of claim 10 and further storing instructions causing the display controller to:

delaying the displaying of the corresponding digits sequence representing the supplied altered reset amount; and between said supplying of the altered reset amount and said delayed displaying of the corresponding digits sequence, inserting a distracting optical effect that diverts a player's gaze away for an area of the display where the corresponding digits sequence of the altered reset amount are to be posted.

12. The non-transitory computer-readable storage of claim 10 wherein:

the altering includes applying a random or semi-random offset to the initial reset amount.

13. A machine system having gaming machines and having an ability to suppress recognition by users of one or more of the gaming machines that a prize amount reset event has taken place for one or more of the gaming machines, the system comprising:

first means for detecting by use of one or more processors that a chance-based awarding of a displayed prize amount has taken place for one or more of the gaming machines and a corresponding meter needs to be reset;

second means for deterministically determining by use of one or more processors an initial reset amount for the corresponding meter in response to the detecting of the chance-based awarding;

third means for altering by use of one or more processors the initial reset amount to one whose to-be-displayed digits sequence is at least one of being less easily recognizable by the users than the initial reset amount as constituting a reset amount and having a less attention attracting pattern of its to-be-displayed digits sequence than that of the initial reset amount whereby users viewing a display that presents the digits sequence of the altered reset amount will not as easily recognize from the viewed display of the altered reset amount as compared to that of the initial reset amount that a reset event has occurred; and fourth means for enabling by use of one or more processors a displaying on a display of the digits sequence representing the altered reset amount.

* * * * *